US011557227B2

(12) United States Patent
Sanchez et al.

(10) Patent No.: US 11,557,227 B2
(45) Date of Patent: Jan. 17, 2023

(54) CORTICAL STEGANOGRAPHY

(71) Applicant: SRI International, Menlo Park, CA (US)

(72) Inventors: Daniel Sanchez, Sunnyvale, CA (US); Christopher Connolly, San Jose, CA (US)

(73) Assignee: SRI International, Menlo Park, CA (US)

( * ) Notice: Subject to any disclaimer, the term of this patent is extended or adjusted under 35 U.S.C. 154(b) by 536 days.

(21) Appl. No.: 16/775,581

(22) Filed: Jan. 29, 2020

(65) Prior Publication Data
US 2020/0273375 A1    Aug. 27, 2020

Related U.S. Application Data

(60) Provisional application No. 62/811,385, filed on Feb. 27, 2019.

(51) Int. Cl.
*G09C 5/00* (2006.01)
*G06N 20/00* (2019.01)

(52) U.S. Cl.
CPC .............. *G09C 5/00* (2013.01); *G06N 20/00* (2019.01)

(58) Field of Classification Search
CPC ................. G09C 5/00; G06N 20/00
USPC ........................................ 706/13
See application file for complete search history.

(56) References Cited

PUBLICATIONS

Neural Reversible Steganography with Long Short-Term Memory Department of Computer Science, University of Warwick, Coventry CV4 7AL, UK Copyright © 2021 Ching-Chun Chang (Year: 2021).*
Audio Steganography : The art of hiding secrets within earshot (part 1 of 2) https://sumit-arora.medium.com/audio-steganography-the-art-of-hiding-secrets-within-earshot-part-1-of-2-6a3bbd706e15 Sumit Kumar Arora Jun. 13, 2018 (Year: 2018).*

* cited by examiner

*Primary Examiner* — Benjamin A Kaplan
(74) *Attorney, Agent, or Firm* — Rutan and Tucker, LLP

(57) ABSTRACT

A machine and its modules assist in steganography for an animal. A steganography module applies behavioral sequencing to create a cover message and a hidden message to covertly pass information from one animal to another animal, with the information embedded in an individual's brain. A visual module references the steganography module to cause a sequence of visual images on a display screen to guide a motor sequence of an individual as the cover message as well as detect and communicate a timing of the individual's motor sequence, relative in timing, to visual images in the sequence of visual images being displayed on the display screen, in order to train in the cover message and hidden message. The hidden message is then extracted at a destination from a sensor monitoring the individual's sequence of motor actions.

20 Claims, 19 Drawing Sheets

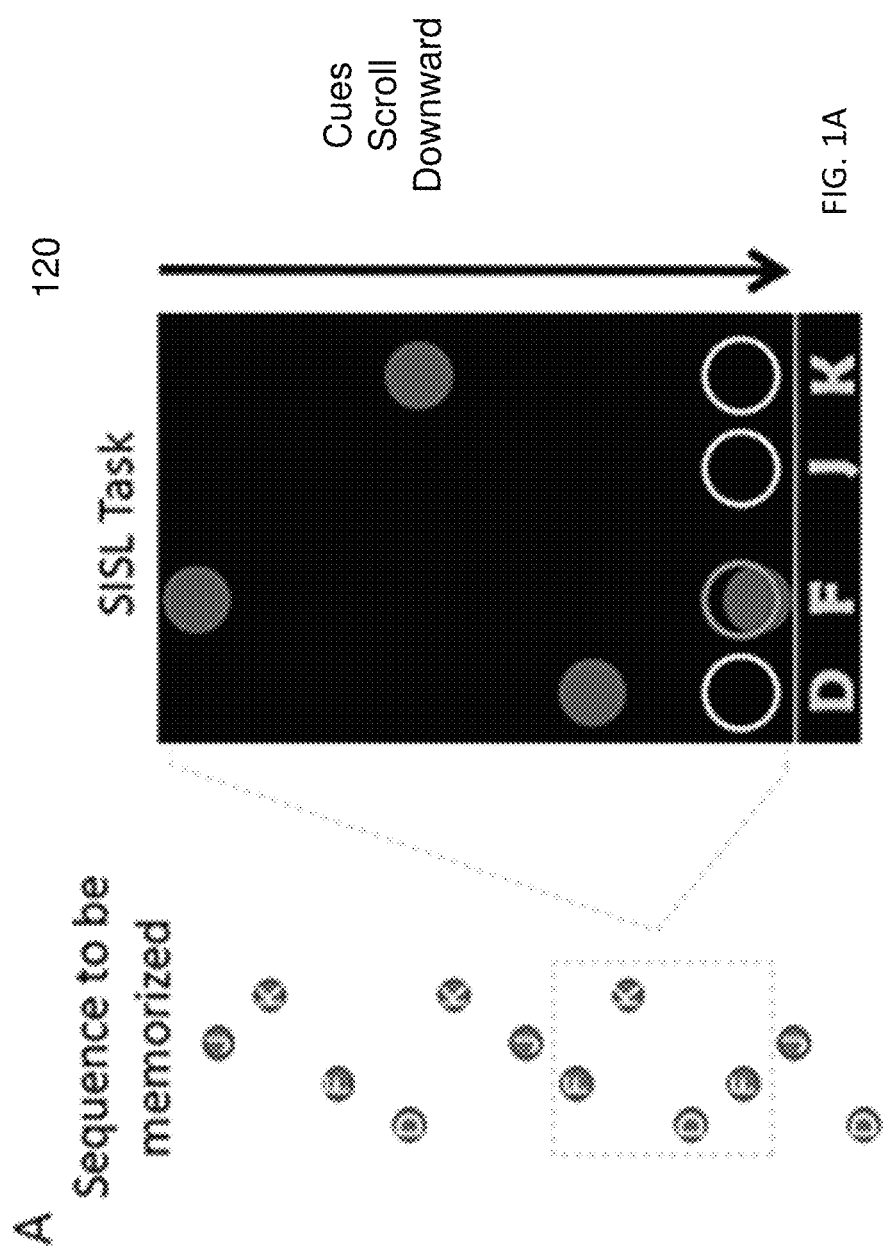

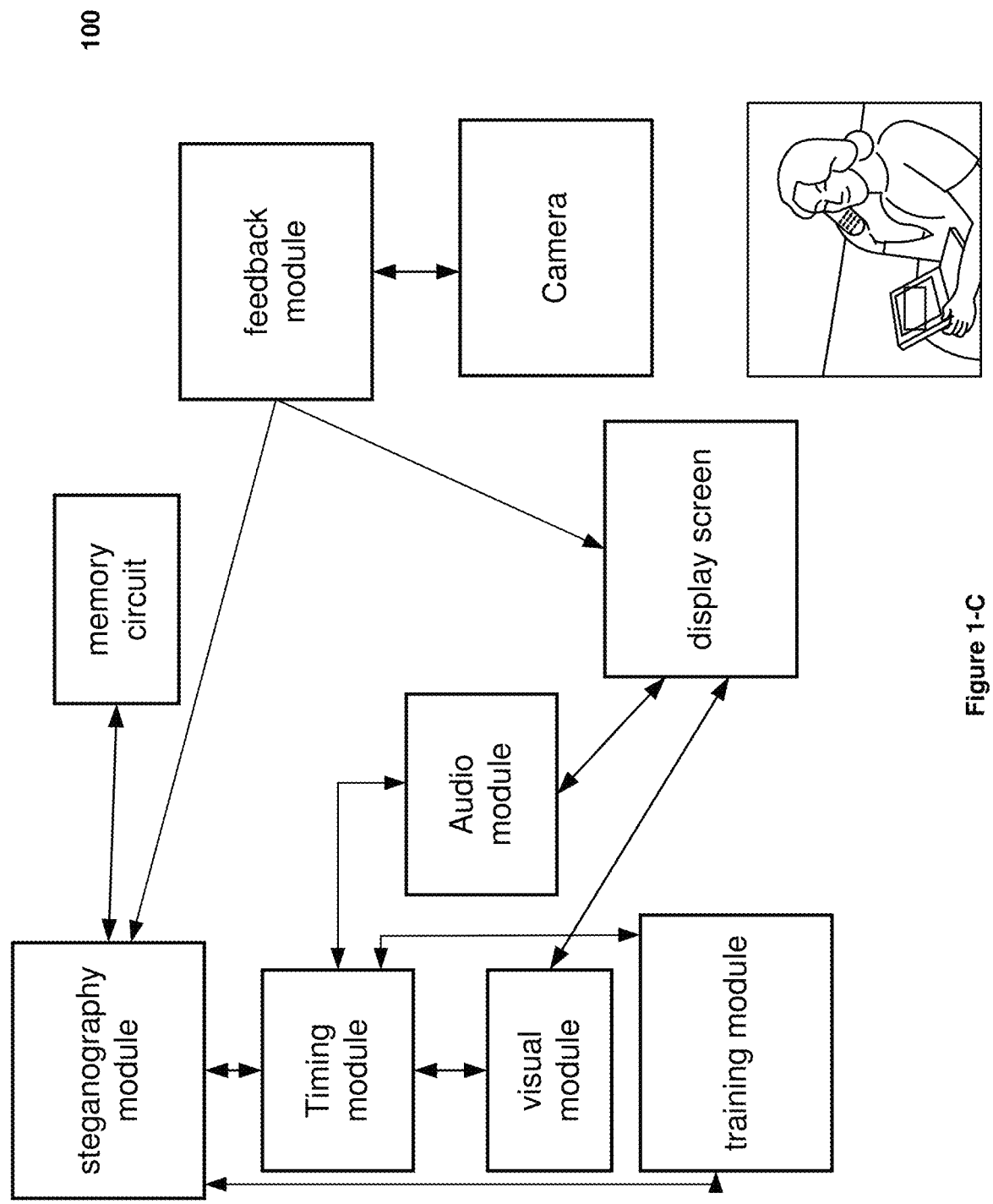
Figure 1-C

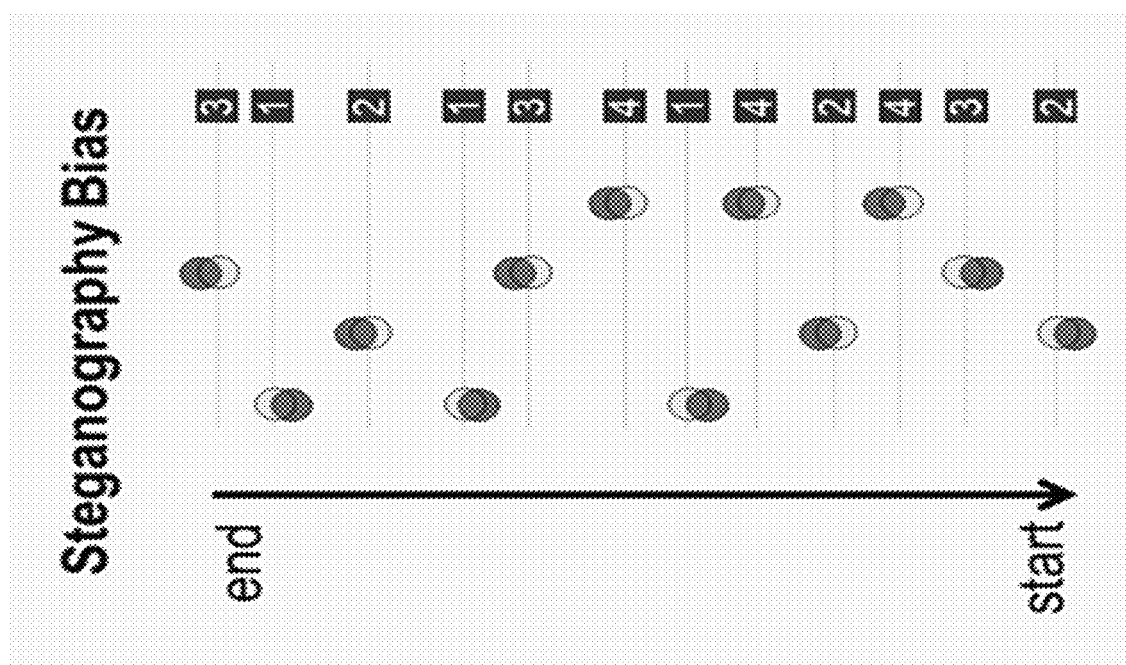
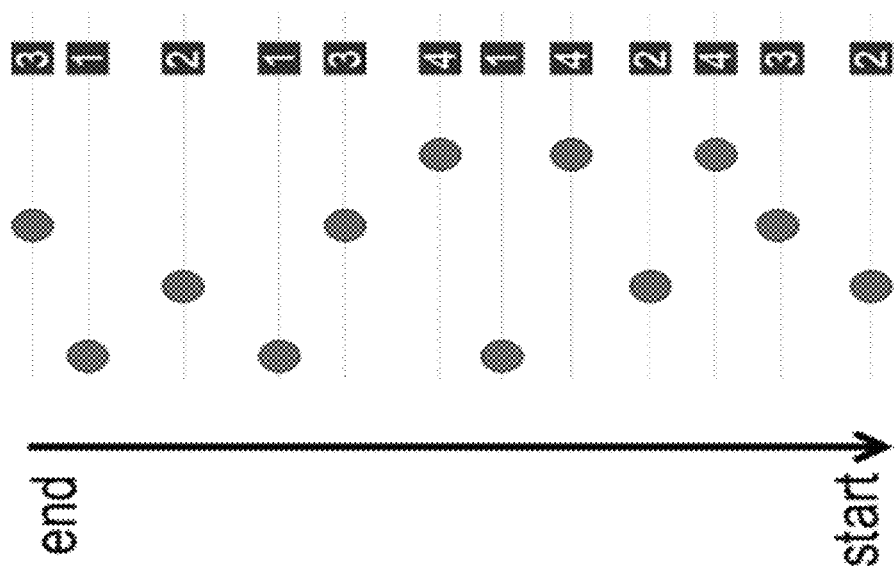
Figure 11

CORTICAL STEGANOGRAPHY

INCORPORATION BY REFERENCE

This application claims priority under 35 USC 119 to U.S. provisional patent application Ser. 62/811,385, filed Feb. 27, 2019, titled 'Cortical Steganography.' All publications mentioned in this specification are herein incorporated by reference in their entirety to the same extent as if each individual publication was specifically and individually indicated to be incorporated by reference.

GOVERNMENT RIGHTS

This invention was made with government support under grant no. CNS-1228460 awarded by the National Science Foundation. The government has certain rights in the invention.

BACKGROUND

In virtual-reality, we could use components—i) a pair of goggles to visually display through the 3D world to the user's mind and ii) then some gloves with haptic feedback to reinforce the displayed visual images in order to make both the mind and body believe that this person is actually in that 3-D world. We also could use a specifically configured machine to induce a hypnosis on a person's mind. The machine displays the regular patterns needed to induce hypnosis on the brain. Many machines exist that are designed to modify and/or augment the brain of an animal.

General steganography algorithms can used for images and videos that factor in a change of direction in deciphering a hidden message.

What is needed is a specifically configured machine to assist in steganography for an animal, such as a person, using an individual's mind and body.

SUMMARY

A machine, a process, and a system are discussed to assist in implementing steganography for an animal, such as a human, using its body movements and its brain as the storage mechanism for the cover message, the hidden message, and the sequences of body movements.

In an embodiment, the machine to assist in steganography for an animal can include several modules.

A steganography module uses behavioral sequencing to create an ability to create a cover message and a hidden message to covertly pass information from one animal to another animal, with the information embedded in an individual's brain.

A visual module cooperates with the steganography module. The visual module causes a sequence of visual images on a display screen to guide a motor sequence of an individual as the cover message and communicate with a feedback module to detect and communicate a timing of the individual's motor sequence, relative in timing, to visual images in the sequence of visual images being displayed on the display screen, in order to train in the cover message and hidden message.

An offset in the individual's motor sequence, guided by a training module, conveys the hidden message of the steganography, which is not accomplished by passing digital information in a memory circuit or via a wireless signal, but rather the hidden message is stored inside the individual's brain and then extracted at a destination from a sensor monitoring the individual's sequence of motor actions of one or more body parts.

BRIEF DESCRIPTION OF THE DRAWINGS

FIGS. 1A-B illustrate a diagram of an embodiment of (A) a first example of a training sequence and (B) a Serial Interception Sequence Learning (SISL) task.

FIG. 1C illustrates a block diagram of an embodiment of a machine to assist in steganography for an animal.

FIG. 11 illustrates a diagram of an embodiment of a comparison of time and order password responses where the image on the right shows the presence of steganography bias.

DETAILED DESCRIPTION

Figure 1B:
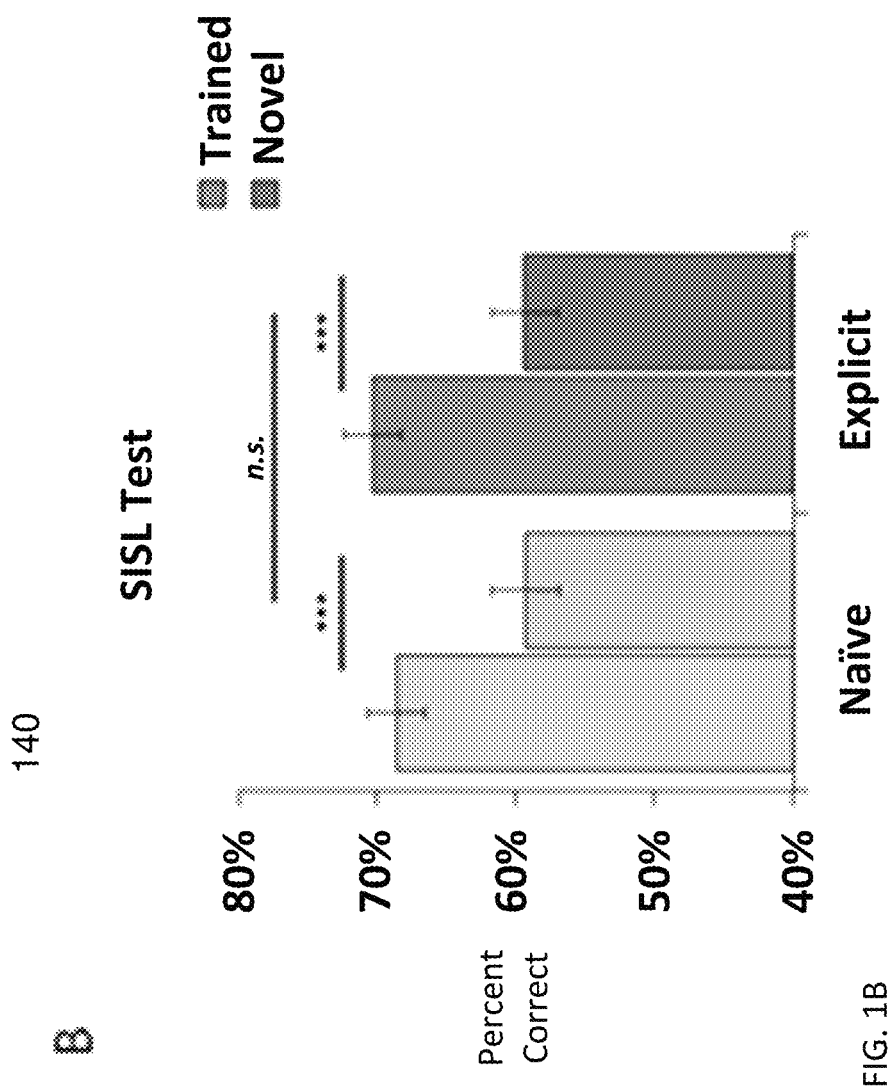

This disclosure describes inventive concepts with reference to specific examples. However, the intent is to cover all modifications, equivalents, and alternatives of the inventive concepts that are consistent with this disclosure. It will be apparent, however, to one of ordinary skill in the art that the present approach can be practiced without these specific details. Thus, the specific details set forth are merely exemplary, and is not intended to limit what is presently disclosed. The features implemented in one embodiment may be implemented in another embodiment where logically possible. The specific details can be varied from and still be contemplated to be within the spirit and scope of what is being disclosed. A first module does not imply a sequential order to a second module, rather, a first module is different than a second module.

In general, steganography can be a technology to hide/conceal a secret file, a confidential message, an image within another image, etc. and the subsequent extraction of the secret file, the confidential message, the image, etc. at its destination. The machine and its modules herein can train steganography as a sequence of representative acts in order to train in i) a cover message for ii) underlying covert information in the hidden message. The modules can achieve hiding and recovering the hidden message through systematic biasing within the sequence of representative acts of the individual's movement of body parts.

A machine, a process, and a system are discussed to assist in implementing steganography for an animal, such as a human, using its body movements and its brain as the storage mechanism for the cover message, the hidden message, and the sequences of body movements.

FIG. 1C illustrates a block diagram of an embodiment of a machine to assist in steganography for an animal. The machine 100 may consist of various modules and components that in some examples can be dual purposed to both i) train in information into the animal's brain as well as ii) capture actions of body parts of the animal to decode and decipher hidden information, such as confidential information, secrets, etc., from those actions.

Training in the Cover Message and Hidden Message to be Stored in the Animal's Brain An individual can be trained on a cover message and hidden message in a secure location.

The machine 100 will consist of multiple modules cooperating with each other.

A steganography module may use behavioral sequencing (e.g. steganography) to create an ability to create a cover message and a hidden message to covertly pass information from one animal to another animal, such as one person to another person, with the information trained into/embedded into an individual's mind/brain.

A visual module cooperates with the steganography module. The visual module causes a sequence of visual images on a display screen to guide a motor sequence of an individual as the cover message and communicates with a feedback module to detect and communicate a timing of the individual's motor sequence, relative in timing, to visual images in the sequence of visual images being displayed on the display screen. The timing of the individual's motor sequence, relative in timing, to i) visual images, including flashes of light and other light patterns, actual images, icons, video game avatars, etc., in the sequence of visual images being displayed on the display screen, ii) audio cues, iii) haptic feedback, and iv) any combination of these sensory prompts, in order to train in the cover message and the hidden message.

The individual's motor sequence also conveys the hidden message of the cerebral steganography. Note, the hidden message is not accomplished by passing digital information in a memory circuit or via a wireless signal, but rather the hidden message is stored inside the individual's mind/brain and then extracted at a destination from a sensor monitoring the individual's sequence of motor actions.

A training module cooperates with the steganography module and a timing module to cause the sequence of visual images on the display screen to guide the motor sequence of the individual to learn both the cover message and the hidden message embedded in the sequence of actions. The training module, an audio module, and the visual module, can all cooperate to provide visual images, audio cues, and haptic feedback to guide the motor sequence and its timing for the individual to learn the cover message and the hidden message. The training module, an audio module, and the visual module can all cooperate, for example, as an app on a smart mobile device to cause i) visual images, ii) audio cues, iii) haptic feedback and iv) any combination of these, to train in the motor sequence of the individual and the biasing of that sequence to embed the hidden message. The training module and the visual module can be configured to cooperate to utilize a large range of devices to visually train the motor sequence of the individual, for example, including i) a joystick, ii) a moving image projected on a display screen, iii) an application on a smart mobile device, iv) an application on a desktop computing device, v) a guitar, and vi) any combination of these.

The training module and steganography module cooperate to ensure the systematic training of bias will be easy to produce, be reliable (e.g., will produce a resilient bias that is decodable), and that may will persist over a lengthy period of time.

The steganography module can cooperate with the timing module, the visual module, and the audio module to cause a biasing of a timing of the motor sequence of the individual with the audio module making audio sounds. The audio module can make audio sounds, with a speaker, or a chirp, relay clicks, etc. The audio module makes these audio sounds relative to an appearance of visual images from the visual module being displayed on the display screen. The machine 100 uses the motor sequence as the cover message, with the relative timing errors (offset bias) in the actions of the motor sequence relative to displayed images as the hidden message.

The audio module communicating with the training module can make a sound or a series of sounds to cue and communicate to the individual an offset bias in the timing of the individual's motor sequence, relative in timing, to each of the visual images in the sequence of visual images being displayed on the display screen in accordance with instructions from the training module. The individual's motor sequence may be, for example, finger taps in response to a game on a smart mobile device.

The feedback module can use one or more finger taps captured by a touch screen and/or a camera of a smart mobile device to record the offset bias in the timing of the individual's motor sequence, relative in timing, to the visual images in the sequence of visual images being displayed on the display screen. The steganography module can compare a recorded offset bias to a desired offset bias and communicate to the training module to continue the training until the two offsets are within a threshold amount/close enough to readily detect the information in the hidden message correctly.

Note, in an example use case, the motor sequence is still produced in the correct sequence (e.g.—the individual 1) still plays the song correctly such as on guitar hero, 2) still makes the correct motor movements with fingers on a video game, 3) still performs a correct sequence of knocks on a door, etc.) However, even though motor movements, such as finger swipes, finger taps, arm movements, and key depressions occur in the proper sequence; yet, the intended relative timing errors occur across the motor sequence (such as a pattern of early/late responses) in which hidden bits of information, corresponding to the relative timing errors, can be extracted as a hidden message. For example, an audio cue can bias and cause the individual to respond always slightly early to the visual image being displayed, with this distinct early offset relative to the appearance of the image. The motor response when cued by the audio occurs so that the individual learns to offset the proper motor action to the visual image to occur, for example, 15-20 milliseconds before or after, a typical person normally responds to the appearance of that image. The example 15-20 millisecond offset to respond earlier to the image being displayed can be interpreted as a logical 1. A 15-20 millisecond offset to respond later to the image being displayed can be interpreted as a logical 0. Offsets can correspond to more than the example binary numbers of 0 and 1. A matrix of sequences of actions and offset biases can be set up in the matrix to correspond to, for example, every letter of the English alphabet, etc.

The visual module, the training module, and the feedback module can cooperate to train in an additional password that can be used as an indicator that the cover message and the hidden message are going to occur subsequent to the individual performing the password with the individual's motor sequence. The password prompts the feedback monitoring with a sensor to pay particular attention to the upcoming series of individual actions.

During training, the machine 100 can use, for example, a mobile app and a display screen of a smart mobile device, or similar display device, to visually display the sequence of visual images to the individual's brain to trigger the motor actions. The audio module can make sounds to induce the relative timing differences for the sequence of images, and then some haptic feedback in the smart mobile device to reinforce and/or correct an offset in the timing when the individual is not getting the correct offset bias in their motor sequence in relation to the displayed visual images. Likewise, the training module, audio module, and visual module could also cooperate to use a pair of goggles to visually display the sequence of visual images through the 3D world of the display screen of the goggles to the user's mind and then use some gloves with haptic feedback to reinforce the displayed visual images and then use the audio module to make the sounds to induce the relative timing differences for the sequences of images.

Sensory Prompts for Training

Each sensory prompt can perform a different training function. The machine 100 may use multi-modal stimulus (audio, visual, and potential haptic senses) or uni-modal stimulus to train in the hidden/covert message.

For example, in uni-modal stimulus, the visual module, the steganography module, the feedback module, and the timing module can cooperate to cause the bias and induce relative timing errors. The process uses audio information to in essence modulate the visual training signal (i.e. the cover message that is visually represented). The individual is provided audio cues for 'bias training' to embed the hidden/covert message via causing the timing offset errors of their motor program; and thus, the audio is only used for biasing, and is never transmitted or stored as a sequence part of the cover message that is visually represented.

In an example, in multimodal stimulus, the machine 100 may use multi-modal information to i) visually create the cover message from the visual module for the steganography and then audio information from an audio module for 'bias training' to embed the hidden/covert message. The modules of the machine 100 may also cooperate to use multi-modal training and unimodal extraction/authentication of the hidden message. The machine 100 can use multi-modal information of physical or visual stimulus to train the cover message on the individual human, on an animal (e.g. chimpanzee), or both. Note, the animal undergoing the steganography process, must have both a capability of learning in a repeatable fashion and performing a sequence of motor actions in a predictable timing fashion to perform this steganography method.

Again, during training, the feedback module can use a sensor consisting of any combination of i) a camera, ii) the individual's interaction with a touch screen, and iii) any combination of both to capture an actual sequence the individual's actions (cover message) and their relative timing errors across their motor sequence relative to the displayed images in order to determine whether the offset being trained in is correct for the bits of the hidden message.

Hidden Message Extraction

In general, the visual image stimulus triggers the trained in motor action corresponding to the cover message and the hidden message.

The visual module, the steganography module, the feedback module with the sensor, and the timing module can cooperate to decode and decipher the cover message and the hidden message, at a later time point from a time of the individual's motor sequence training to store the cover message and the hidden message in the individual's brain. The visual module and timing module can cooperate to prompt the individual to perform the motor sequence in response to seeing some or all of the visual images from the training sequence, and the feedback module with the sensor to capture the individual's motor sequence and any offset in relative timing to an appearance of the visual images.

The audio module, the visual module, the feedback module, and the timing module can cooperate to train in the hidden message to be stored inside the individual's mind/brain; and then, to be extracted, at for example a designated destination, from the individual's sequence of motor actions as captured by a sensor such as a camera, touch screen display, etc.

Thus, the visual module, the feedback module, a touch screen as the sensor, and a timing module can cooperate to decode and decipher the hidden message in the sequences of images and the relative timing errors in the individual's sequence of motor actions as captured by the sensor in response to the sequences of images.

During extraction, the machine 100 can use a mobile app and a display screen of a smart mobile device, or similar display device, to visually display the sequence of visual images to the individual's brain to trigger the motor actions. The sensor will analyze the relative timing differences for the sequence of images, and the steganography module decodes the observed offset bias and sequence of actions to decipher the hidden message.

The feedback module can use any combination of i) a camera, ii) the individual's interaction with a touch screen, and iii) any combination of both as the sensor to capture an actual sequence of the individual's relative timing errors across their motor sequence relative to the displayed images in order to detect and decipher relevant bits of the hidden message.

The feedback module is configured to use any combination of i) a camera, ii) the individual's interaction with a touch screen, iii) a keyboard, iv) a device with an accelerometer, and v) any combination of both, as the sensor, to capture an actual sequence the individual's relative timing errors across their motor sequence relative to the displayed images in order to detect and decipher relevant bits of the hidden message. In an example, the feedback module uses both a camera and a touch screen as the sensor monitoring the individual's sequence of motor actions, in order to monitor the individual's interaction with a touch screen to capture their actual sequence and then communicate this feedback to the steganography module to compare a recorded offset to a desired offset and a matrix to decipher what is the hidden message within the cover message.

Note, this training can occur without the individual knowing about it. The steganography module and the training module cooperate to cause the sequence of visual images on the display screen to guide the motor sequence of the individual so that the individual learns the cover message and the offset in the individual's motor sequence so that the individual learns the hidden message, without the individual actually being aware that they are learning the motor sequence that corresponds to the cover message and the offset in the individual's motor sequence that corresponds to the hidden message of the steganography.

The lack of awareness of the individual that they are learning the motor sequence that corresponds to the cover message and the offset in the individual's motor sequence that corresponds to the hidden message does not substantially affect any of i) a time to learn the motor sequence and the offset in the individual's motor sequence, ii) gaining an ability to perform the motor sequence and the offset in the individual's motor sequence, and iii) any combination of these two.

More Detail on the Machine and its Modules Utilize to Implement Steganography on an Animal The training module and the steganography module are configured to cooperate to take into consideration the following analysis in FIGS. 1A-12.

Learning a new skill typically incorporates both explicit memorization of rules or content knowledge and a period of practice where performance of the skill is honed and improved. Memorization of relevant information relies on the operation of the medial temporal lobe (MTL) memory system that supports acquisition of facts and events that can later be consciously retrieved. During repetitive practice, performance improves without being accompanied by easily describable knowledge indicating that implicit learning plays an important role, likely by shaping cortical processing circuits to improve processing efficiency. The distinction between these modes of learning has been eloquently described as part of the process of preparing for professional performance by musicians as completely independent processes of 'learning' (from practice) and 'memorization' (of the musical score). However, within laboratory-based research, studies of implicit and explicit learning have tended to show separate and parallel learning processes, or even that knowledge across systems can compete or interfere with each other. A key unanswered question in skill learning and memory systems theory is how these types of information can be used in a synergistic manner to adaptively improve behavior.

Here, evidence is provided that these two types of memory contribute to skilled performance in different ways that are each based on their specific operating characteristics. Implicit learning accumulated through repetitive practice improves efficiency in processing circuits to allow for fast, precise execution of skills, but with limited flexibility. In contrast, explicit memory is consciously retrieved, allowing for flexible application of knowledge, but which may be more effortful to apply. When laboratory task demands are constructed to selectively rely on the characteristics of one system, independent or competitive interactions will be observed among the two types of memory. However, when task demands are designed to allow for contributions from both types of memory, one should be able to observe a more adaptive cooperative interaction between implicit and explicit memory that likely plays a greater role in many cognitive skill learning contexts.

Using an implicit skill learning task, implicit learning leads to excellent performance under typical conditions; however when the ability to apply implicit knowledge is disrupted, explicit knowledge can be utilized to partially rescue skilled performance. The Serial Interception Sequence Learning (SISL) task requires participants to make rapid and precisely timed responses to a series of moving cues that follow a covertly embedded repeating structure. After practicing the task, participants exhibit improvements in sequence-specific task performance without awareness of the learned knowledge. In addition, unlike many other implicit learning tasks, providing participants with full explicit sequence knowledge has no material impact on task performance or the expression of sequence-specific performance gains. Across three experiments here it is shown that fast, precise skilled performance depends on implicit learning under unconstrained conditions (Example 1) but when implicit knowledge application is disrupted by creating need for flexible knowledge use, explicit memory can partially rescue performance (Example 2). In a third example, this effect is replicated and shown to be dependent on time available to apply explicit knowledge.

By leveraging the differing characteristics of implicit and explicit memory, robust evidence of a positive interplay between the two types of learning that are each optimized for different aspects of complex skill acquisition can be seen. This reflects a cooperative interaction among memory systems previously unseen in memory research. Indicating the potential for synergy between implicit and explicit memory systems that is likely to occur commonly in complex skill acquisition and to support complex skilled performance across environmental challenges.

FIGS. 1A-B illustrate a diagram of an embodiment of (A) a first example of a training sequence and (B) a SISL task.

Example 1

Participants: Forty-four undergraduates (25 female, $M_{age}$=18.8 years) at Northwestern University received course credit for participation.

Example 1, Materials: SISL task 120—Participants intercept scrolling cues by pressing a corresponding keyboard button when the cue overlaps a target ring (FIG. 1A). A sample training sequence is shown in the SISL task 120 that a participant would learn during training with the SISL task 120. Participants in the Explicit memorization condition would receive time prior to beginning the SISL training to memorize the 12-item sequence. Initially, audio and/or haptic cues scrolled at 10.8 degrees/second, reaching the target 1.5 seconds after appearing on screen (time-to-target). Responses were considered correct if the appropriate key was pressed while the cue was within half a cue length on either side of the target, making the initial correct response window approximately 170 ms. Responses were incorrect if they were made outside this window, if the wrong key was pressed, or if multiple responses were made closest to a single cue. As shown in the SISL test data 140 in FIG. 1B, task difficulty was adaptively adjusted by changing the cue velocity to keep the overall performance rate at around 75% correct. Cue velocity adapted to performance after every 12 trials during training. Percentage correct of 80% or higher reduced the time-to-target by 50 ms while performance of 65-79% decreased the time-to-target by 25 ms (reduced time-to-target leads to higher cue velocity). Percentage correct between 25% and 64% increased the time-to-target by 25 ms, and performance lower than 25% caused an increase of 50 ms, but it never increased above the initial 1.5 seconds. ISIs adjusted with task velocity such that the cues maintained their visual distance.

Participants were not told that the cues followed a repeating 12-item sequence for 80% of the training trials (20% of the trials were novel, non-repeating sequences). All sequences (trained or novel) were selected from a pool of 256 unique sequences and were not repeated during the experiment. Sequence order followed second-order conditional (SOC) structure with no repeats (e.g., D-D), making a trigram (e.g. D-K-F) the smallest statistically predictable structure. The sequences also followed a specific timing interval pattern of short and long inter-stimulus intervals (ISIs), of either 2.5 or 5 cue lengths, respectively. SISL training consisted of six 480-trial blocks. Each block contained 32 repetitions of the repeating sequence and eight repetitions of novel, unrepeated sequences. The training blocks were constructed such that a novel sequence appeared once for every four repetitions of the trained sequence. Novel sequences never repeated and were not used as foils during the implicit or explicit knowledge tests.

A 540-trial test block followed directly after training, with no indication that it was different from the preceding training blocks. The test block consisted of 15 repetitions each of the trained sequence and two novel sequences and was structured so that every 60 trials (five sequence repetitions) represented performance on one of the three sequences (the order of sequence presentation was randomized). The SOC sequences assigned to training and test were completely orthogonal so that no sequence shared any of the same trigrams (e.g., D-F-K, D-F-D, D-F-J).

Example 1—Procedure—Participants were randomly assigned to either an Explicit pre-training instruction condition, where they were instructed to memorize their 12-item sequence for the SISL task 120 before SISL training (FIG. 1A), or to an Implicit knowledge condition, where they were not told about the repeating sequence. In the explicit condition, participants were instructed to memorize their sequence and then watched their repeating sequence scroll five times. They were also notified that their repeating sequence would not always be present during training. Participants in the implicit condition were kept naïve to the repeating structure during training but were informed prior to the explicit knowledge measures.

Prior to SISL training, all participants completed a short 24-trial demonstration of the SISL task 120. After completing the SISL portion of the task, all participants then completed tests that assessed explicit knowledge of the repeating sequence. First, a recognition test was given in which participants were shown their trained sequence and four novel sequences, presented in 24-trial (two-repetition) blocks within the SISL context. Participants rated their confidence for each sequence on a scale from −10 to +10, as to how likely each was the trained sequence. Participants then completed an explicit recall task in which they saw only the target rings and were instructed to indicate the repeating sequence using the keyboard buttons over 24 responses (2 repetitions). Recall knowledge was scored as the longest matching subsequence between the responses and trained sequence.

Example 1—SISL Performance—Sequence-specific learning (training phase) was scored as the percentage correct difference between SISL performance on the trained sequence and the novel sequences. A mixed ANOVA of condition (explicit, implicit) and training block (1-6) revealed an overall linear increase in sequence-specific performance across training, $F(1.42)=17.47$, $p<0.001$, $\eta\rho^2=0.29$. There was neither a main effect of condition, $p>0.25$, nor an interaction effect, $p>0.25$, and linear models of learning in the naïve ($y=4.1\%+1.3\beta$) and explicit ($y=3.1\%+1.5\beta$) groups showed that they learned at comparable rates. At test, a mixed 2×2 ANOVA of condition (explicit, implicit) and sequence type (trained, foils) showed that participants performed the trained sequence (M=69.43%, SE=1.23%) significantly better than the novel sequences (M=59.36%, SE=1.62%), $F(1.42)=43.51$, $p<0.001$, $\eta\rho^2=0.51$. Again, there was neither a main effect of condition, $p>0.25$, nor an interaction, $p>0.25$, suggesting that the sequence-specific performance improvements (FIG. 1B) in the explicit condition (M=10.88%, SE=2.15%) were not significantly different from the implicit condition (M=9.26%, SE=2.17%). The cue velocity of the SISL task 120, measured as time-to-target, increased in a linear trend throughout training and test, $F(1.42)=222.29$, $p<0.001$, $\eta\rho^2=0.84$, such that the time-to-target at test was 1.05 s (SE=0.04) and did not differ between conditions (interaction and main effect, $p>0.25$). Participants in the Implicit condition who were naïve to the repeating sequence had a sequence-specific performance advantage at test that was nearly identical to participants who had time to explicitly memorize the sequence prior to training.

Example 1—Explicit Knowledge Tests: Mixed 2×2 ANOVAs of the recognition and recall test results assessed the effect of pre-training on reportable explicit knowledge after training. Participants provided higher recognition confidence values for the trained sequence (M=4.89, SE=0.71) compared with novel foil sequences (M=−1.37, SE=0.62), $F(1.42)=31.77$, $p<0.001$, $\eta\rho^2=0.43$. To determine baseline performance in the recall task, participants' responses were compared against the remaining pool of unused, novel SOC sequences and the average matching subsequence was calculated. This baseline measure is expected to be higher than a randomly generated response due to the SOC structure present across all of the sequences (e.g., no repeats). Recall test performance elicited sequences which matched the trained sequence (M=5.52, SE=0.33) slightly better than novel SOC sequences (M=4.43, SE=0.03), $F(1.42)=10.32$, $p=0.003$. However, neither a main effect of explicit knowledge condition nor an interaction effect was found in either the recognition (condition, $p>0.25$; interaction, $p=0.22$) or the recall test analyses (both $p>0.25$), suggesting that participants in the explicit condition did not have improved explicit knowledge expression over participants in the implicit condition.

Example 1—Discussion: During 192 repetitions of practice performing the sequence, explicit sequence knowledge not only did not contribute materially to task performance, but appears to have been essentially abandoned. Participants who memorized the sequence prior to training showed little explicit knowledge immediately after completing the training (and executing the sequence repeatedly). This result replicates prior findings, where there was no contribution to sequence-specific learning and extends it to show that if a reminding procedure is not used during training, participants will simply forget the explicit sequence.

These findings raise a critical question of what is the role of explicit knowledge during skill learning. One possibility is that there is essentially none, that explicit knowledge is only used early in learning as a "scaffold" that supports initial performance but is abandoned once implicit learning accrues. Another possibility is that explicit knowledge plays a selective role only as needed, for example in error recovery that requires more flexible use of knowledge than is supported by implicit learning. To test this idea, in Example 2, the inflexibility in implicit learning from SISL is employed in order to disrupt performance. In this condition, cue-order information was masked so that participants were cued to respond but had no perceptual information as to which response was correct. This was intended to disrupt the application of implicit knowledge and the key question was whether participants could successfully bring explicit knowledge to bear in order to support performance. If so, participants who had memorized the sequence should exhibit better performance during these "gaps" in the perceptual cue information sequence in the task.

Figure 2A:
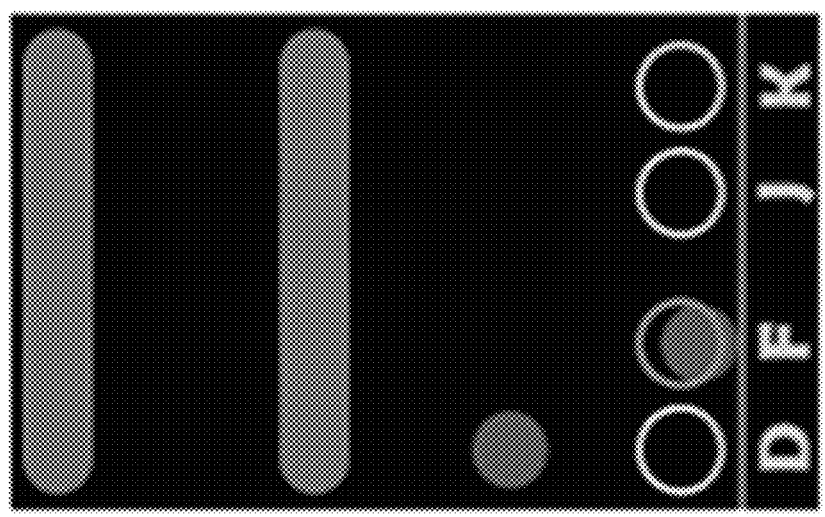
FIGS. 2A-B illustrate a diagram of an embodiment of (A) masked cues during a SISL gap test and (B) an example 2 SISL gap test results.
Figure 2B:
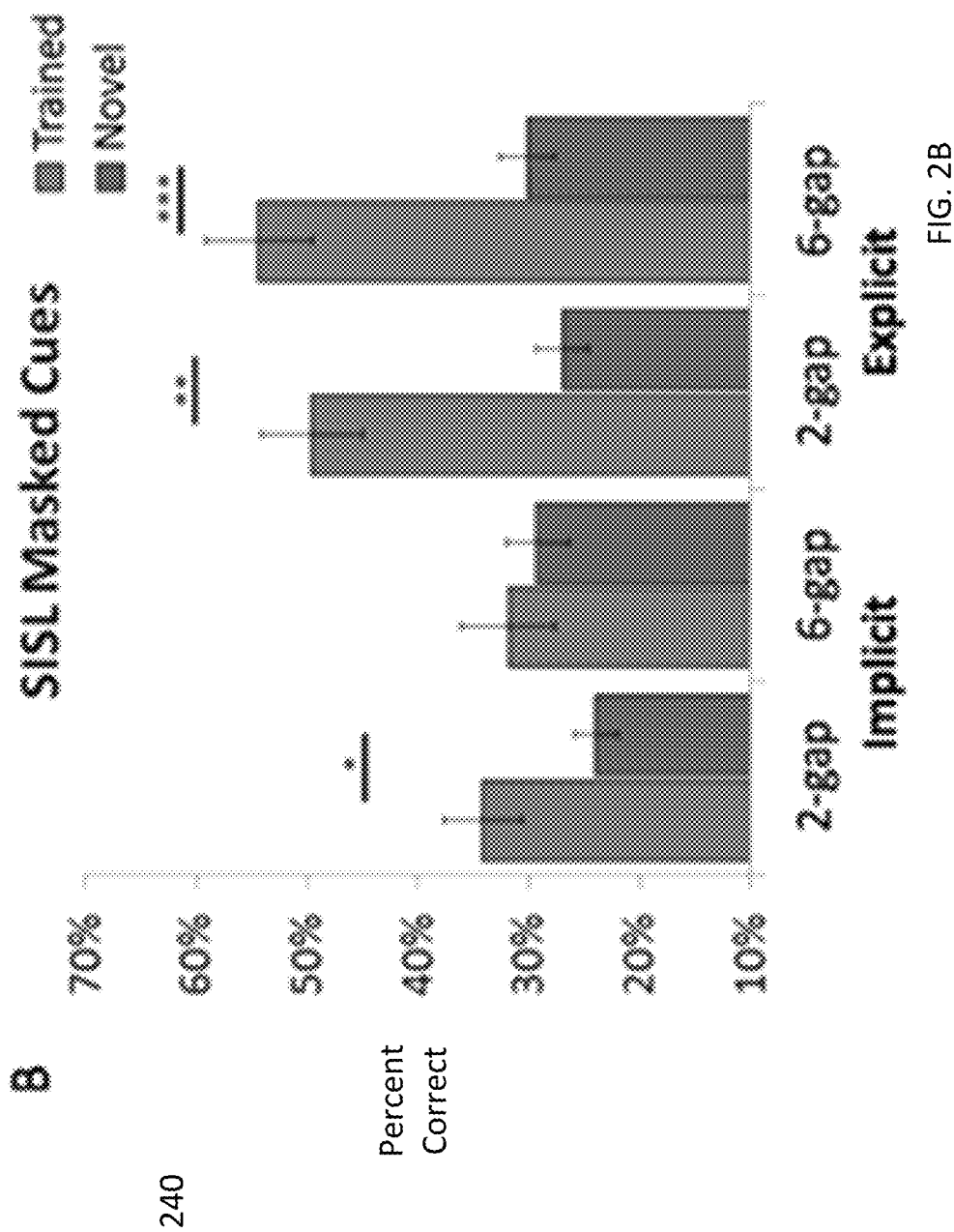

FIGS. 2A-B illustrate a diagram of an embodiment of (A) masked cues during a SISL gap test and (B) an example 2 SISL gap test results. In FIG. 2A, the diagram 220 shows horizontal bars provide timing information but mask the ordinal information about which key to depress. In FIG. 2B, the diagram 240 shows a graph regarding masked cues.

Example 2

Participants—Thirty-two participants from the Northwestern University community received course credit or $10/hour for participation. One participant stopped responding, so their data was removed, leaving 31 participants in the analysis (17 female, $M_{age}$=20.16 years).

Example 2—Materials—The SISL task was administered in largely the same manner as Example 1 with two differences. First, no non-repeating segments were included during training to maximize experience with the trained sequence. Second, the adaptive difficulty was adjusted to target a performance rate of 85-90% correct to provide more experience with long sequences of correct responses during learning. Cue velocity increased by five percent if performance was 100% correct for an entire sequence repetition, or decreased by five percent if performance was below 75% correct. Cue velocity adjustments were administered throughout test so participants would be able to respond to the more difficult masked cues. No feedback about response correctness was provided to the masked cues (see FIG. 2A) because the response difficulty likely would have resulted in overwhelming negative feedback. For the masked cues, the rings flashed blue for every motor response.

To promote explicit knowledge of the sequence in the Explicit condition, SISL training cues were color-coded, and recall practice trials were introduced between the training blocks. For the color-coding, the sequence items (1-12) were shaded from a dark blue to a light blue to signal the beginning and end points to help track the sequence. The cues were all the same shade of blue in the naïve condition. For the recall practice trials, participants watched their sequence scroll slowly and then attempted to generate it on the keyboard from memory. Feedback about the correctness of the entire sequence response was provided after every trial.

The SISL test consisted of three 480-trial test blocks containing the trained sequence and one novel sequence. Every sixty trials represented performance on one of the sequences. In the first test block, no cues were masked, so that implicit sequence-specific performance advantage (SSPA) could be assessed across groups. 2-trial and 6-trial gaps were present in the second and third test blocks, respectively. To control for the amount of missing information, 20% of the trials were masked in both blocks (96 masked trials per test block). For every 60 trials in the 2-trial gap block, there were six 2-trial gaps and in the 6-trial gap block there were two 6-trial gaps. Masked gaps were only included after the first six trials of the 60-trial sub-block so that participants could use this information to potentially guide responding during the masked trials (i.e. an implicit system learning second-order conditional statistics needs at least two preceding items to predict a third, and an explicit system would need to consciously realize they were performing the trained sequence). A minimum of three normal cues was present between each gap.

Example 2—procedure: As in Example 1, participants were randomly assigned to an Explicit or Naïve condition, however, the explicit instruction was strengthened to create better conscious sequence knowledge. Prior to SISL training these participants viewed the sequence five times with instructions to memorize and were also presented with a small version of the entire 12-item sequence on the screen (as in FIG. 1A). Explicit participants also performed recall practice trials between each SISL training block, where they were instructed to view and recall their sequence three times (15 total). For both conditions, during SISL training, participants received six 384-trial blocks (192 repetitions of a 12-item sequence, total). After training, participants in the naïve condition were made aware of the repeating sequence and all participants were administered the two tests of explicit knowledge (recall, recognition) as in Example 1.

Recognition and recall tests were given directly after training, prior to the SISL performance tests. This procedure is unlike the standard practice in implicit learning research where the explicit knowledge tests are given last in order to avoid confounding motor performance with explicit knowledge. Here, the explicit tests were conducted prior to the SISL test in order to prevent confounding them with the novel foil sequences that appear in the SISL test. The recall test was administered first to gauge the instructed explicit knowledge in the explicit participants and the spontaneous explicit knowledge that may have developed in the naïve participants. The recognition test was given directly after the recall test so that the foil sequences from the recognition test did not impact the recall test results.

Participants were then given a short demonstration of the masked-trial version of the SISL task and were administered the final SISL test. Participants were instructed that they should try and respond as best as possible to "fill in the gaps" and that the order of cues would occasionally follow the repeating structure from training. For the SISL test, participants first completed a 480-trial block that followed the same structure as Example 1 (trained sequence performance contrasted with a repeating, but novel, sequence). This was followed by two 480-trial Gap Test blocks in which 'gaps' in the sequence cue information were created with a full-width cue (masking the correct response) for 2 or 6 successive responses (FIG. 2A). For these trials, participants need to use memory of the trained sequence in order to make the correct response. A series of consecutive masked cues that did not provide key response information were presented during the Gap Test blocks. In this example, the series of masked cues has just started after the presentation of a series of standard cues. In this instance, a participant was cued to respond with F and then D, but would then have to recall the following responses from their explicit memory.

Example 2—SISL Performance—During the SISL test block with no masked cues, sequence knowledge was assessed with a 2×2 mixed ANOVA of sequence type (trained, novel) and training condition (naïve, explicit). There was a significant main effect of sequence type, $F(1.29)$ =35.82, $p<0.001$, $\eta \rho^2$=0.55, but neither a main effect of condition (p>0.25) nor an interaction effect, F(1.29)=1.39, p=0.25, reflecting that the sequence-specific performance advantage was similar across groups. Participants in both conditions performed the trained sequence (naïve, M=86.11%, SE=1.37%; explicit, M=87.01%, SE=1.45%) better than the novel sequence (naïve, M=78.44%, SE=1.34%; explicit, M=75.57%, SE=1.74%), such that both groups demonstrated significant and similar sequence-specific performance advantages (naïve, p=0.002; explicit, p<0.001).

SISL task cue velocity was examined to assess for condition-dependent changes in general task performance. SISL task cue velocity changed significantly across the training and test blocks, F(1.89, 54.83)=31.49, p<0.001, $\eta\rho^2$=0.52, Greenhouse-Geisser corrected. The initial time-to-target of 1.5 seconds reached 1.06 seconds (SE=0.10) during the SISL test with no masked cues, but dropped to 1.51 seconds (SE=0.12) during the 2-gap test and 1.91 seconds (SE=0.20) during the 6-gap trial test. There was no main effect of training condition, F(1.29)=1.85, p=0.18, nor an interaction with training and test block, p>0.25.

Example 2—Explicit Knowledge Tests: During the 15 recall practice trials, Explicit participants correctly reproduced the entire 12-item trained sequence an average of 10.4 times (SE=1.1), exhibiting excellent conscious knowledge of the repeating sequence. On the final explicit post-test, participants in the Explicit condition were near ceiling in reproducing the entirety (M=11.13 items, SE=0.47) of their 12-item trained sequence (chance; M=4.18, SE=0.08, t(15)=15.44, p<0.001) and were completely confident in identifying their trained sequence (M=10.00 SE=0.00) from foils (M=−9.58, SE=0.35), t(15)=56.36, p<0.001. Participants in the Naïve condition were not capable of recalling a subsequence that matched the training sequence (M=4.87 items, SE=0.46) greater than chance (M=4.36 items, SE=0.08), t(14)=1.22, p=0.24, but provided higher recognition scores for the trained sequence (M=5.53, SE=1.13) than to foils (M=−3.88, SE=1.29), t(14)=5.44, p<0.001.

Example 2—SISL Gap Test: SISL performance over the masked trials was assessed with a 2×2×2 mixed ANOVA comparing performance on sequence type (trained, novel) and gap size (2-trials, 6-trials) between the two training conditions (Explicit, Naïve). There was a main effect of sequence type, F(1.29)=21.86, p<0.001, $\eta\rho^2$=0.43, and training condition, F(1.29)=16.14, p<0.001, $\eta\rho^2$=0.36, and an interaction between sequence type and training condition, F(1.29)=7.12, p=0.01, $\eta\rho^2$=0.20. No other comparisons reached significance (main effect of gap size, p=0.20; gap size by condition, p>0.25; sequence type by gap size, p>0.25; three-way interaction, p=0.25), likely reflecting the increased performance for the trained sequence trials in the explicit group. As seen in FIG. 2B, participants in the explicit condition performed the masked trained sequence trials significantly better in the 2-trial (M=49.61%, SE=4.69%) and 6-trial (M=54.43%, SE=4.81%) gaps, compared to the novel sequences (2-trial: M=27.08%, SE=2.31%, p=0.001; 6-trial: M=30.21%, SE=2.56%, p<0.001). Participants who were naïve to the repeating sequence exhibited a smaller, yet significant, performance benefit during the 2-trial gaps for the trained sequence trials (M=34.17%, SE=3.53%) compared to the novel trials (M=24.03%, SE=1.97%), t(14)=2.59, p=0.02. However, during the 6-trial gap performance at test, naïve participants performed the masked trained sequence trials (M=31.94%, SE=4.18%) at similar levels as the novel trials (M=29.31%, SE=2.79%), p<0.25 (FIG. 2B). Participants who received the explicit training in Example 2 were capable of utilizing their explicit knowledge to produce a significant sequence-specific performance benefit for the trained sequence trials during the Gap Test. However, participants in the Implicit condition, who were not given explicit training, were only capable of producing a small, yet significant, benefit for their trained sequence during the 2-trial gaps. Without explicit training there was no material difference between trained and novel sequence performance during the 6-trial Gap Test.

Example 2—Naïve Explicit Knowledge Use: To examine the interaction between explicit knowledge and SISL performance in the naïve group, a correlation between the recognition score and SISL learning scores was assessed. Further supporting the lack of explicit knowledge benefit to perceptually-guided SISL performance, the recognition score was negatively correlated (r=−0.15) with the SISL learning score during the test with no masked cues. However, the gap performance benefit that was significantly expressed by the naïve participants during the 2-item gap test was significantly correlated (r=0.54, p=0.04) with the recognition scores, suggesting that the development of concomitant explicit knowledge may have been related to this gap performance.

Example 2—Performance Across the Gap: To determine if explicit knowledge was expressed equally well across the entire gap, we examined performance based on the item location within the gaps. For the 2-trial gaps, a 2×2×2 ANOVA (item number, sequence type, condition) revealed a significant main effect of item number, F(1.29)=17.16, p<0.001, $\eta\rho^2$=0.37, showing that the first item was performed (M=46.91%, SE=3.42%) better than the second item (M=37.37%, SE=3.42%) in the gap. However, all of the interaction effects with item location were not significant (ps>0.25), suggesting that this performance effect was consistent across sequence types and training condition.

Figure 3:
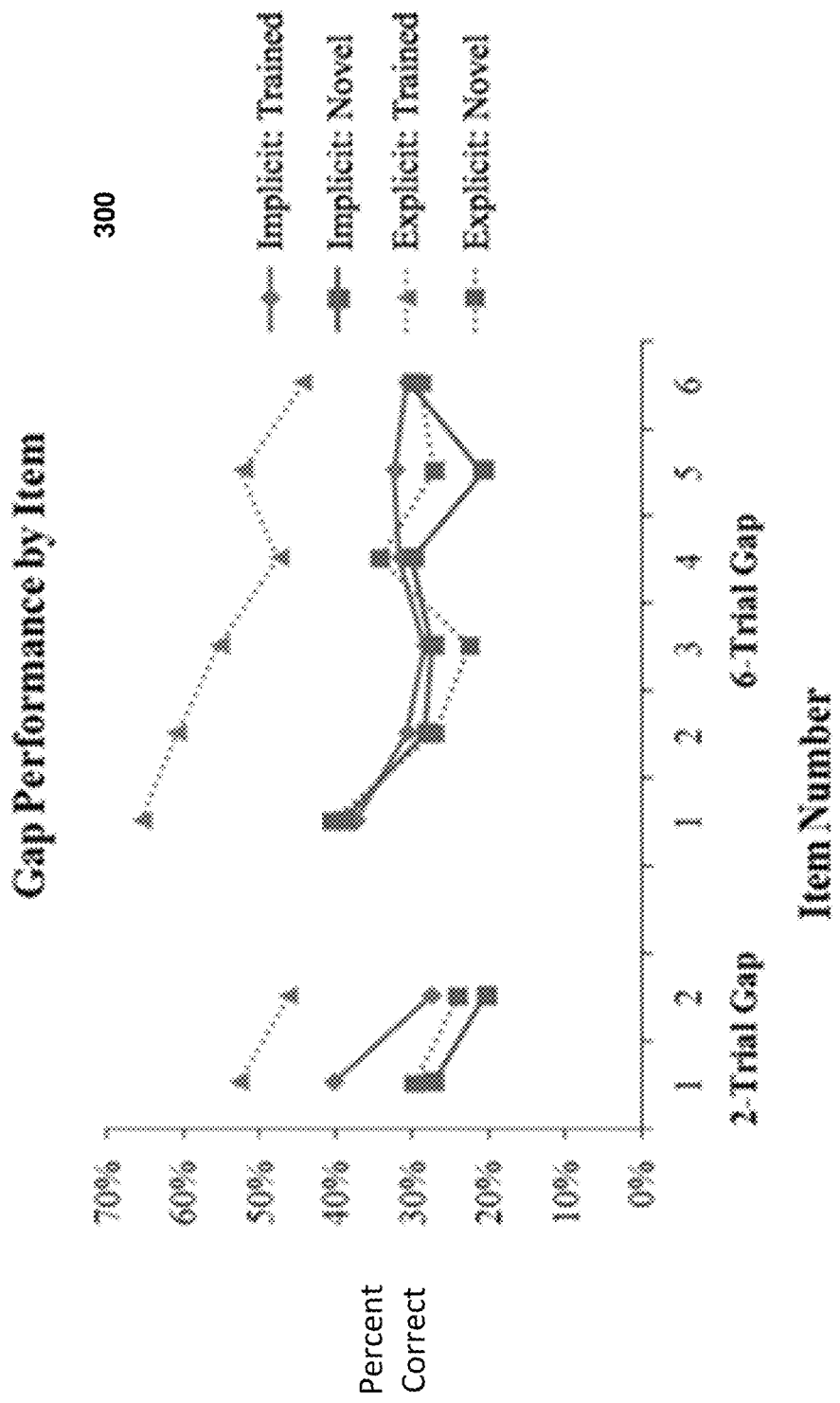
FIG. 3 illustrates a diagram of an embodiment of individual item SISL performance on masked trials during the 2-trial and 6-trial Gap Test blocks.

FIG. 3 illustrates a graph 300 of an embodiment of individual item SISL performance on masked trials during the 2-trial and 6-trial Gap Test blocks. The graph 300 shows gap performance as measured by percent correct vs item number for 2-trial gaps and 6 trial gaps.

A 6×2×2 ANOVA of the 6-trial gap performance revealed a similar effect of a significant decrease in performance, F(5.145)=5.74, p<0.001, $\eta\rho^2$=0.17, across the first to last gap items. Item number did not significantly interact with training condition, p>0.25, or sequence type, p=0.20, and the three-way interaction did not reach significance, p>0.25. Interestingly, the sequence-specific performance benefit for the naïve participants that was present in the 2-trial gap test block was absent during the first two items during 6-trial gap performance (FIG. 3). Individual item SISL performance on masked trials during the 2-trial and 6-trial Gap Test blocks is shown. Participants' naïve to the sequence were capable of demonstrating an ability to continue responding during short masked gaps, but this ability declined when the gap length was increased. Participants with explicit knowledge, reinforced by the sensory stimulus from an example machine to assist in steganography for the animal, were capable of planning the correct sequence of motor movements during these gaps in both the short and long gap test conditions, as to keep performance above baseline levels.

Example 2—Discussion: With extra opportunities to study and memorize the sequence, the Explicit participants completed the training phase with high levels of explicit sequence knowledge (unlike Example 1). However, this extra information still provided no additional performance benefit on the SISL sequence knowledge assessment with standard perceptual cues, when performance on the trained sequence was compared to novel repeating sequences. However, on the Gap test in which the masked cues no longer indicated the correct response, the advantage of explicit knowledge with an example machine to assist in steganography for an animal was revealed. During the masked trials, the participants that trained without explicit knowledge performed at chance levels, indicating the disruption of implicit knowledge application. Participants with robust explicit knowledge were able to rescue their performance, making correct responses at levels significantly above chance. Thus, although explicit knowledge did not contribute to better learning or performance under traditional conditions, it provides the ability to rescue performance when implicit memory fails.

The synergistic interaction here is the first experimentally controlled demonstration of a positive, cooperative interaction between implicit and explicit memory that highlights how each type of memory is specialized for different environmental demands. The greater flexibility in knowledge use afforded by explicit knowledge only comes into play as needed when the implicit knowledge is unavailable (due to the gaps in presentation). However, even with nearly perfect explicit memory of the sequence, participants only produced correct responses on approximately half of the masked trials, suggesting that SISL task performance demands may exceed that which can be achieved solely through explicit knowledge. In Example 3, we tested two hypotheses about the limits of using explicit memory to guide performance, while also replicating the key synergistic effect of Example 2. One hypothesis for the somewhat low performance during the gaps is that explicit knowledge application simply be too slow because it requires a conscious, effortful retrieval process in order to use. Alternately, it may be difficult to apply representations held consciously in mind to guide precisely timed motor responses, leading to more inaccurate key pressing. In Example 3, we varied the time available to guide explicit responses during the SISL test in three ways: a Slow task condition, a Fast task condition, and a Planning condition where pauses were provided to allow for explicit retrieval and planning of upcoming responses. It was expected that a particularly fast pace would limit application of explicit knowledge compared with a slower condition. If the bottleneck were due to information retrieval, pauses to allow for planning of upcoming responses would then lead to better performance during the transfer test.

Example 3

Participants—Seventy-six participants from the Northwestern University community received course credit or $10/hour for participation. Five participants did not finish the experimental protocol in the hour-long session, and data from one participant was removed due to long periods of non-responding at test, leaving 70 participants in the final results analysis ($M_{age}$=19.14, 38 female).

Example 3—materials: The SISL task was administered in the same manner as Example 2, with the only differences being the structure and velocity adjustments during test. Cue velocity during test did not adapt to performance, but was determined by finding the maximum training speed (MTS) participants achieved during SISL training. The Fast and Planning blocks during test were set as the MTS, while the Slow test was set 2.5× slower. For example, if the maximum speed (measured as time-to-target) a participant reached during training was 1000 ms, then the Fast and Planning tests would be set to a constant speed of 1000 ms while the Slow test would be set to a constant speed of 2500 ms. This multiplier value (2.5) was chosen by assessing the cue velocity differences between training and the 6-gap test performance in Example 2. The Planning test featured 5-second pauses directly prior to each 6-trial gap in order to allow participants to plan their next responses. The gap was between the last normal cue and first masked cue. After the final normal cue entered the screen, no masked cues followed, alerting the participant that they were about to encounter a masked gap. After 5 s, the masked cues entered the screen and the test continued at the normal MTS rate until either the test block was over, or the participant encountered another gap. The tests were performed in blocks and were counter-balanced for order or fatigue effects.

For Planning blocks, the cues moved at the Fast speed but a 5 second pause was provided before each 6-item sequence where the cues were masked.

Each SISL test consisted of two 480-trial blocks, separated by a rest break. Each 960-trial test featured four separate conditions based on sequence type (trained, novel) and gap size (no gap, 6-trial gap). Each condition was administered in pseudo-randomly intermixed 60-trial sub-blocks such that no more than two of the same condition could directly repeat. Each test contained two sub-blocks (120 trials) of the no gap condition for each sequence type, and six sub-blocks (360 trials) of the 6-trial gap condition for each sequence type. Implicit sequence performance was assessed as the sequence-specific performance advantage for the trained sequence versus the novel sequence during the normal/standard cue presentation across all gap conditions. Explicit sequence performance was assessed as the explicit gap advantage exhibited during the 6-trial gaps during the trained sequence trials compared to the novel trials.

Example 3—procedure: Half of the participants were randomly assigned to perform the Fast and Slow SISL tests, while the remaining half of the participants performed the Fast and Planning tests. Participants received explicit pre-instruction and SISL training on the trained sequence, identical to the procedure for the explicit condition in Example 2. Directly after training, participants were administered the recall and recognition tests (counter-balanced for order effects) and the SISL Transfer test (as in Example 2).

After SISL training and the explicit knowledge tests, participants received demonstrations of the different test conditions they were to perform. The demonstrations consisted of two repetitions of their trained sequence (24-trials) in each of their assigned test conditions. During the test, there were Fast, Slow and/or Planning blocks. Participants received two conditions each, either Fast and Slow or Fast and Planning in counter-balanced order blocks. Blocks were 480 trials each and contained 120 trials without any masked cues and 360 trials where 6-item masked cue gaps were periodically interspersed.

Figure 4A:
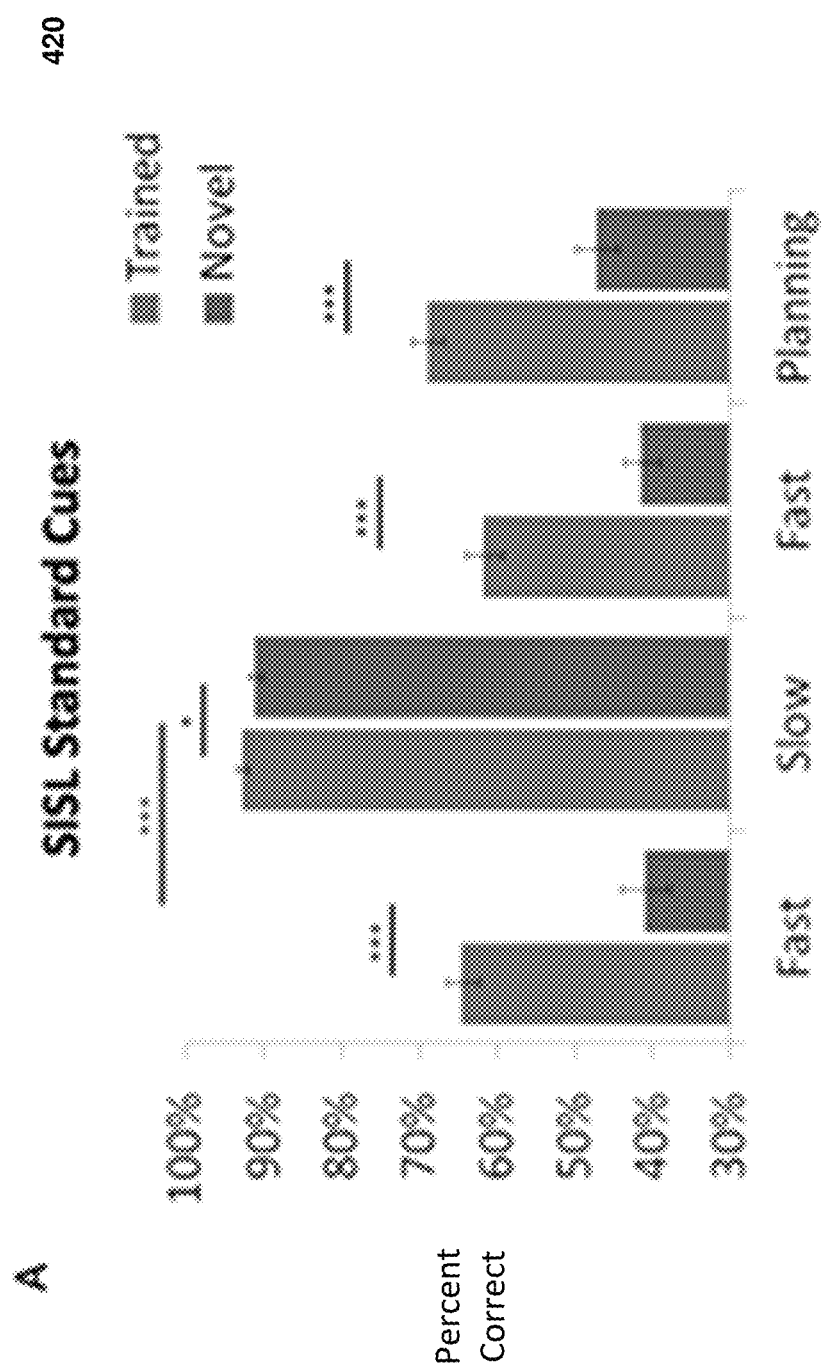
FIGS. 4A-B illustrate a diagram of an embodiment of (A) performance during the Fast, Slow, and Planning SISL Tests, and (B) SISL Gap Test performance during the Fast, Slow, and Planning conditions.
Figure 4B:
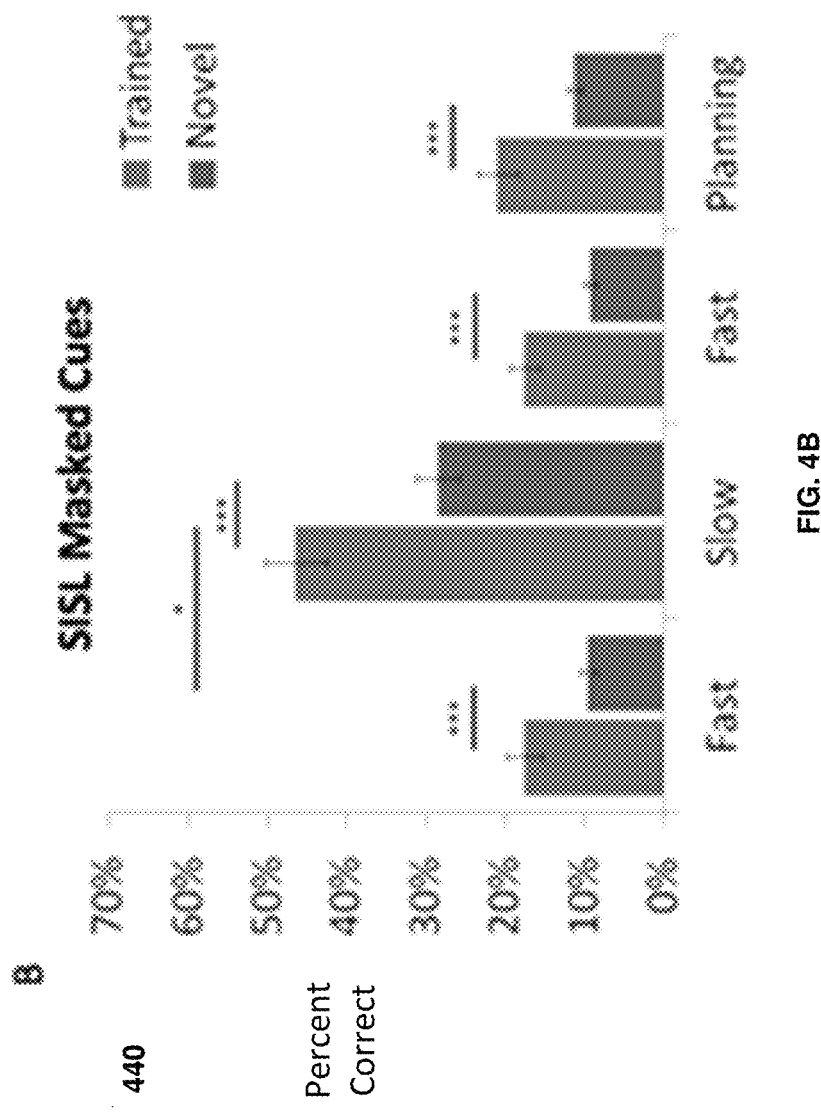

FIGS. 4A-B illustrate graphs of an embodiment of (A) performance during the Fast, Slow, and Planning SISL Tests, and (B) SISL Gap Test performance during the Fast, Slow, and Planning conditions. FIG. 4A illustrates a diagram of a graph 420 regarding SISL standard cues. FIG. 4B illustrates a diagram of a graph 440 regarding SISL masked cues.

Example 3—SISL Performance Test: The effect of test type on implicit knowledge was assessed with 2×2 repeated-measures ANOVAs of sequence type (trained, novel) by condition (Fast-Slow, Fast-Planning) on the performance during standard perceptually-guided cues. Implicit sequence knowledge was expressed across all conditions, as evidenced by a significant main effect of sequence type on both the Fast-Slow condition, $F(1.31)=120.39$, $p<0.001$, $\eta p^2=0.80$, and Fast-Planning condition, $F(1.37)=150.24$, $p<0.001$, $\eta p^2=0.80$ (FIG. 4A). The different test types also had a general effect on performance (compared to the Slow blocks), as there were main effects of test type block within each condition as well (Fast-Slow, $F(1.31)=229.41$, $p<0.001$, $\eta\rho^2=0.88$; Fast-Plan, $F(1.37)=33.89$, $p<0.001$, $\eta\rho^2=0.48$).

As shown in FIG. 4A, there were ceiling performance effects during the Slow test, which may have contributed to the low sequence-specific performance advantage (M=1.7%, SE=0.8%) compared to the Fast test (M=23.5%, SE=2.0%), $F(1.31)=109.09$, $p<0.001$, $\eta\rho^2=0.78$. Despite this difference, sequence expression was significant during both the Fast, $t(31)=11.49$, $p<0.001$, and Slow, $431)=2.10$, $p=0.04$, tests. For the participants who received the Fast and Planning tests, robust sequence expression was found during both the Fast test (M=20.3%, SE=1.8%) and Planning test (M=21.7%, SE=2.0%), and did not significantly differ, $p>0.25$. As FIG. 4A shows, when implicit performance was guided by the perceptual cues, sequence knowledge expression was significantly better during the Fast and Planning tests than during the Slow test. B) SISL Gap Test performance during the Fast, Slow, and Planning conditions.

Example 3—Explicit Knowledge Tests: During the recall practice trials, participants correctly reproduced the trained sequence an average of 11.83 times (SE=0.36) out of 15. On the explicit recall test, participants were successful in reproducing the entirety (M=11.71 items, SE=0.11) of their 12-item trained sequence (chance; M=4.15, SE=0.02, $t(69)=76.17$, $p<0.001$). Similarly, participants were confident in identifying their trained sequence (M=9.54 SE=0.14) from foils (M=−7.84, SE=0.40), $t(69)=40.90$, $p<0.001$.

Example 3—SISL Gap Test: Masked cue performance was assessed with 2×2 repeated-measures ANOVAs of sequence type (trained, novel) and test type (Fast-Slow, Fast-Planning). Participants were capable of expressing sequence knowledge during the masked cues, as evidenced by main effects of sequence type in both the Fast-Slow condition, $F(1.31)=37.58$, $p<0.001$, $\eta\rho^2=0.55$, and Fast-Planning condition, $F(1.37)=19.44$, $p<0.001$, $\eta\rho^2=0.34$. As seen in FIG. 4B, the expression of explicit sequence knowledge in the Fast-Slow condition was significantly better during the Slow test (M=18.0% SE=3.7%) than during the Fast test (M=8.1%, SE=1.8%), $F(1.31)=6.48$, $p=0.02$, $\eta\rho^2=0.17$. Expression was significant during both the Slow, $t(31)=4.90$, $p<0.001$, and Fast, $t(31)=4.52$, $p<0.001$, test conditions, despite this interaction. However, sequence knowledge expression was very similar in the Fast-Planning conditions (Fast: M=8.4%, SE=2.2%, $t(37)=3.73$, $p<0.001$; Planning: M=9.8%, SE=2.2%, $t(37)=4.40$, $p<0.001$), reflecting no significant sequence expression benefit from the Planning phase, $p>0.25$. Similar to the results for the standard cues, task difficulty due to test type was reflected in a main effect in both the Fast-Slow condition, $F(1.31)=105.67$, $p<0.001$, $\eta\rho^2=0.77$, and the Fast-Planning condition, $F(1.37)=5.17$, $p=0.03$, $\eta\rho^2=0.12$. During the masked cue trials when performance was supported by explicit knowledge, sequence knowledge expression was best during the Slow test. Explicit sequence knowledge expression was similar across the Fast and Planning conditions, suggesting that providing time for explicit memory retrieval and response planning did not benefit performance.

Figure 5A:
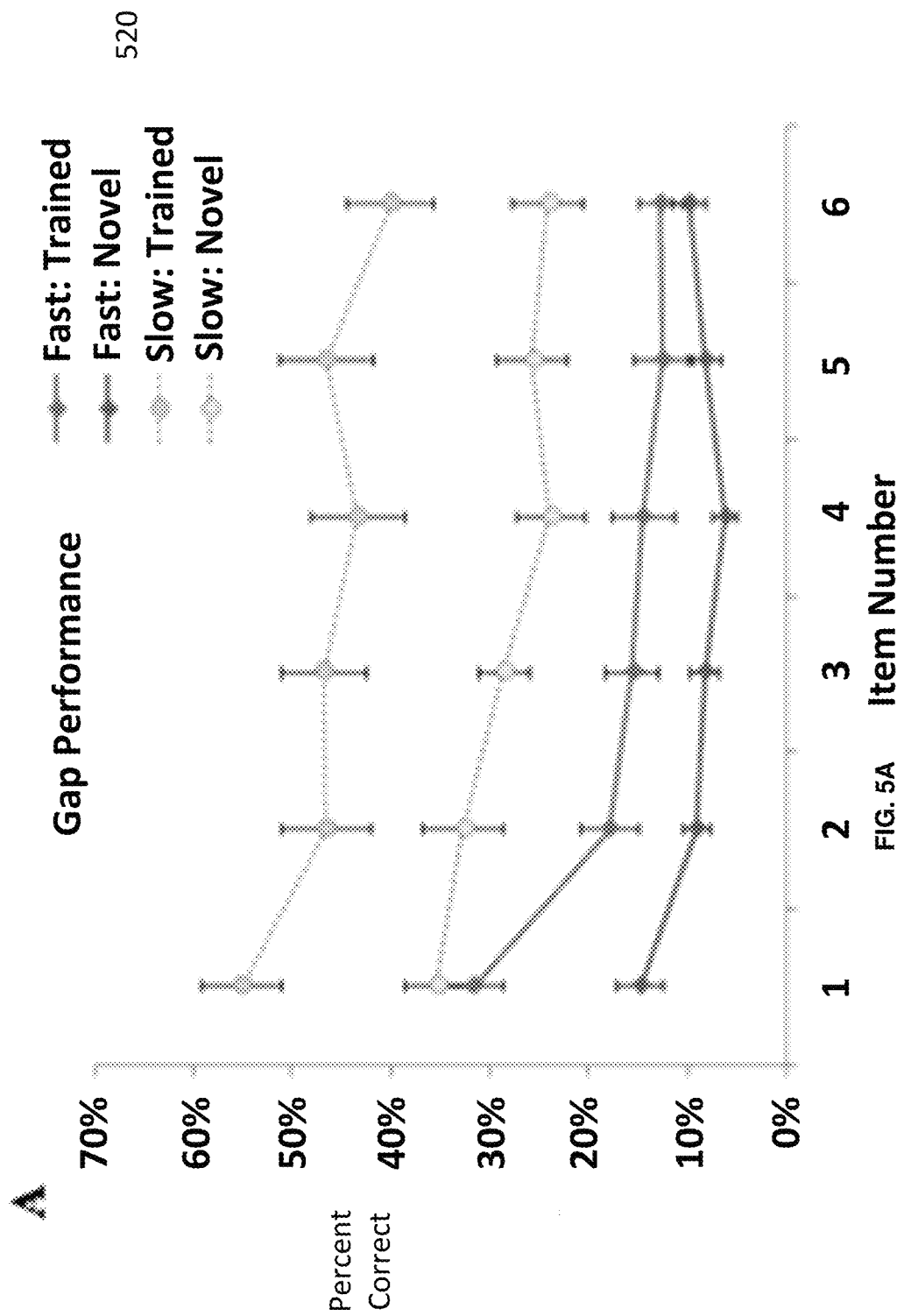
FIGS. 5A-B illustrate a diagram of an embodiment of (A) the average percent correct across the six different gap items during the Fast and Slow test conditions, and (B) The average percent correct across the six different gap items during the Fast and Planning test conditions.
Figure 5B:
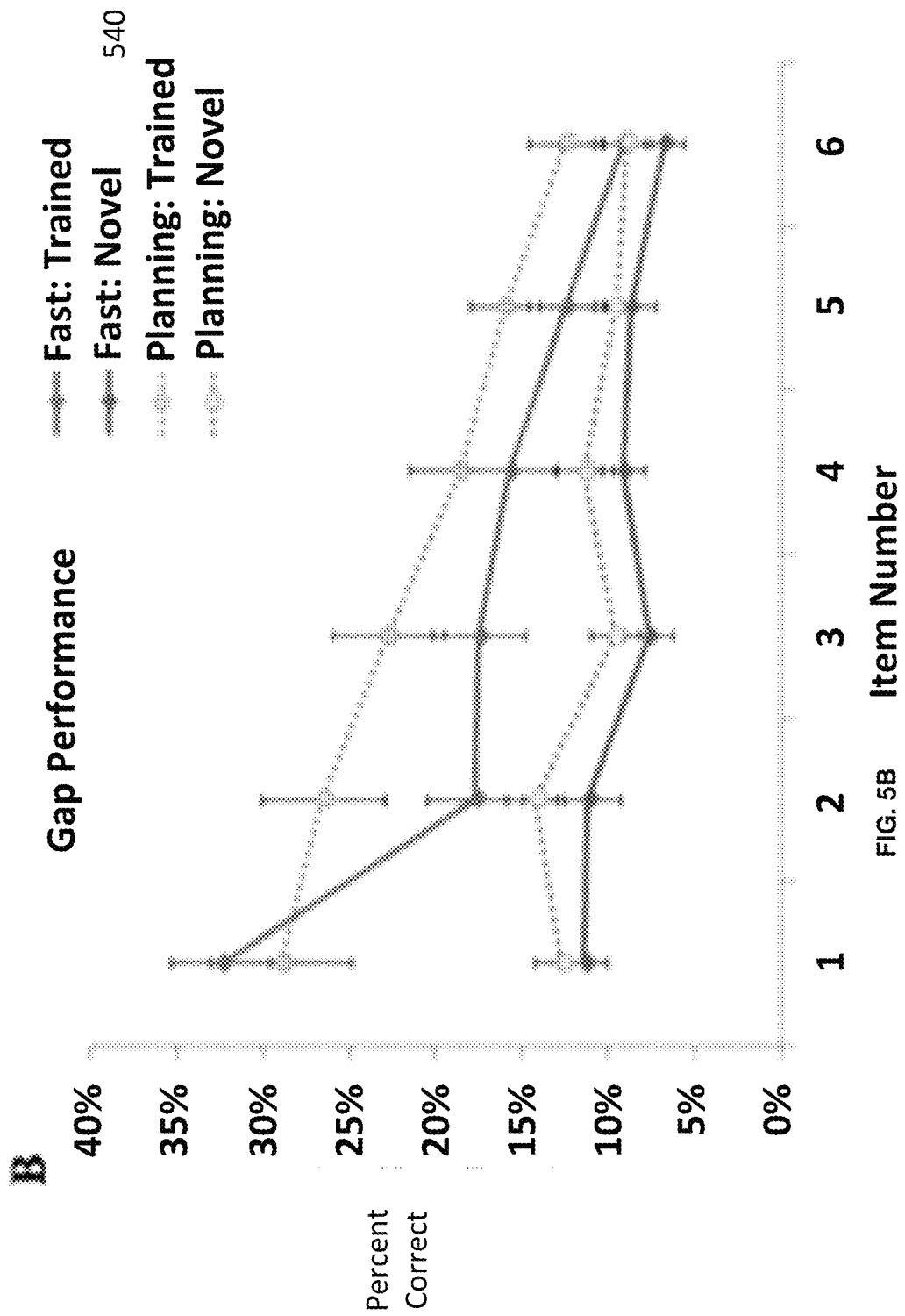

FIG. 5A illustrates a graph 520 of an embodiment of gap performance as measured by the average percent correct across the six different gap items during the Fast and Slow test conditions. FIG. 5B illustrates a graph 540 of an embodiment of gap performance as measured by the average percent correct across the six different gap items during the Fast and Planning test conditions.

Example 3—Gap Test Item Analysis: A per-item analysis of the gap trials was assessed to understand how explicit knowledge was expressed across the different test conditions. Specifically, we hypothesized that the percent correct performance should be highest early in the gap (e.g., items 1-3) compared to later in the gap (e.g., items 4-6) because the difficulty in applying knowledge does not support expression to throughout the entire 6-item gap. Performance was examined with 2×2×6 repeated-measures ANOVAs of sequence type (trained, novel), test type (Fast-Slow, Fast-Planning), and gap item (items 1-6). Only the main effect of item and interaction terms will be reported, because the variance in performance across the gap items is the focus of the analysis. As predicted, performance across the items decreased in a linear trend throughout the gap in both the Fast-Slow condition, $F(1.31)=44.90$, $p<0.001$, $\eta\rho^2=0.59$, and the Fast-Planning condition $F(1.37)=68.01$, $p<0.001$, $\eta\rho^2=0.65$. Importantly, item performance interacted with sequence type in both conditions (Fast-Slow, $F(5.155)=2.77$, $p=0.02$, $\eta\rho^2=0.08$; Fast-Planning, $F(5.185)=15.13$, $p<0.001$, $\eta\rho^2=0.29$). As seen in FIG. 5A, this interaction reflects the decrease from item 1 to item 6 being more pronounced in the trained sequence conditions compared to the foil conditions, suggesting it was tied to the expression of sequence-specific knowledge. Although the explicit gap advantage had a larger decrease over the course of the gap items during the Fast test as compared to the Slow test, neither the interaction between item and test type, $p>0.25$, nor the three-way interaction reached significance, $F(5.155)=1.61$, $p=0.16$. In other words, the rate of decrease in performance for the trained sequence across the 6-item gap (particularly in the Fast condition) is greater than for the novel sequences, suggesting that explicit knowledge could preferentially be applied properly early on in the gap, but quickly dropped to baseline levels. As seen in FIG. 5B, there was a pronounced difference in explicit knowledge expression of the trained sequence across the second and third items in the gap between the Fast and Planning test conditions, evidenced through a trending interaction between test type and item number, greenhouse-geisser corrected $F(3.7, 138.1)=2.04$, $p=0.10$, $\eta\rho^2=0.05$. The three-way interaction did not reach significance, $p>0.25$. Again, the novel sequence performance across the 6 items is shown to be stable, while the Trained sequence performance drops significantly.

To determine if participants were recalling the correct sequence information, but simply incapable of expressing it with temporal precision, responses provided during the gap trials were assessed for order correctness, independent of the time the buttons were pressed. Responses that were closest to the masked cues were selected, and the first six responses were compared to the 6-item gap.

Figure 6:
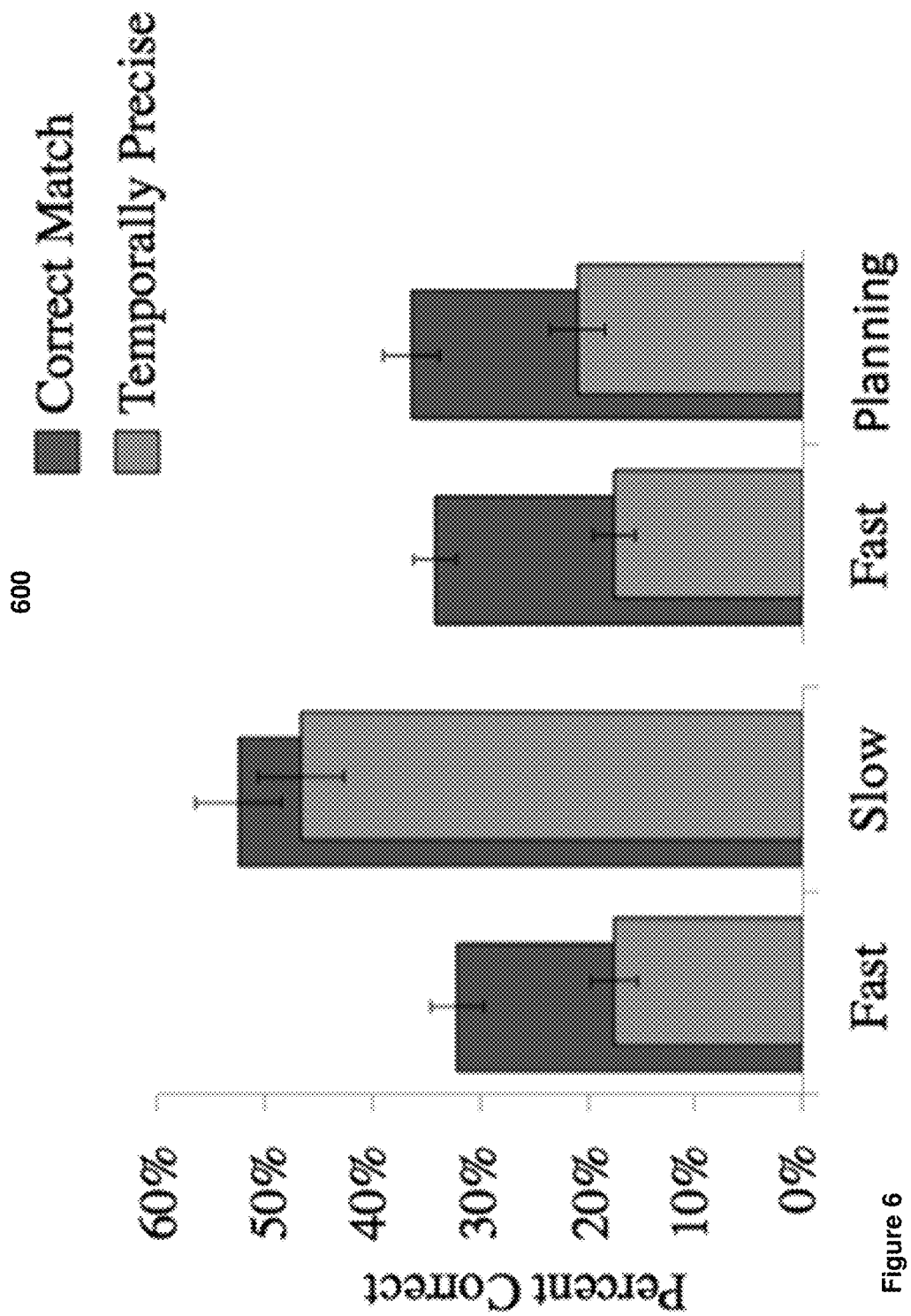
FIG. 6 illustrates a diagram of an embodiment of results for Example 3 Gap test sequence performance during masked cues.

FIG. 6 illustrates a graph 600 of an embodiment of results for Example 3 Gap test sequence performance during masked cues. As seen in FIG. 6, participants were correctly recalling significantly more of the sequence than was determined when temporal accuracy was required. The percent correct difference between temporally precise responses and correctly matched responses during the gap trials was fairly high in both Fast conditions (M=14.54%, SE=1.30%; M=16.59%, SE=1.34%) and the Planning condition (M=15.39%, SE=1.43%), and likely reflects the ability for participants to recall explicit knowledge of the trained sequence, without the ability to use this knowledge for temporally-precise execution. Unsurprisingly, the Slow test condition had a smaller difference between precisely-timed responses and matched recall response (M=5.90%, SE=0.94%). The standard scoring, shown in light blue, represents correct sequence order responses that were made with temporal precision (within the target zone). The dark blue bars represent correct sequence order responses that were made, but without temporal precision—in this case, the keys were pressed in the correct order, but the responses may not have fallen within the appropriate temporal sequence windows. The correct match, without temporal precision, represents the ability for explicit knowledge to be recalled and executed in an attempt to support performance, without an accompanying temporal accuracy that is required for accurate responding.

Example 3—SISL Cue Velocity: SISL task cue velocity increased in a linear trend across training, $F(1.69)=136.97$, $p<0.001$, $\eta \rho^2=0.67$. The mean constant speed for the Fast and Planning tests was 0.72 s (SE=0.02; min=0.42, max=1.18) while the mean constant speed for the slow velocity test was 1.85 s (SE=0.07; min=1.35, max=2.94).

Example 3—Discussion: As in Example 2, explicit knowledge supported better performance during the gap blocks. However, participants had significant difficulty achieving a high level of accuracy during the Gap Test conditions with fast cue velocities, even when planning time was provided prior to motor execution. These results suggest that explicit knowledge is simply not well suited to support rapid execution, as providing time for the retrieval process did nothing to benefit performance (see SOM for additional detailed analysis). Although explicit memory appears capable of providing "rescue support" for motor performance through flexible knowledge representations when implicit memory fails, this comes at an operating cost that prevents it from directly supporting fluid motor execution. As evidenced by the explicit recall test and explicit recall training, participants were fully capable of retrieving their entire sequence from memory and subsequently bringing that to bear to support the motor performance necessary in those assessments. However, the results of Example 3 show that this type of execution does not translate well to the fluid performance required in procedural motor skill expertise.

Across these first three experiments, the interactions between implicit and explicit memory establish an important new extension to the model of human memory systems. While the two types of memory operate largely independently in parallel, complex skilled behavior utilizes both kinds of memory according to how the operating characteristics of each system fits current task demands. Implicit memory supports accurate, fast-paced performance that is acquired gradually through practice, leading to performance on a task like SISL that under typical circumstances is almost entirely based on implicit learning. In contrast, explicit memory allows for flexible use of conscious knowledge that is difficult to apply rapidly and smoothly, meaning that it does not normally contribute materially to SISL performance. However, explicit memory plays a key role when implicit memory is disrupted, allowing for at least partial rescue of skilled performance. Of note, the ability to selectively bring explicit memory to bear on performance requires being aware that the application of implicit knowledge is failing somehow and appears to imply an intentional ability to change which system is being relied on for performance. This type of meta-cognitive control over the use of memory systems has not been previously observed and raises an important question about how this process is applied to implicit knowledge represented outside of conscious awareness.

While a novel finding within laboratory studies of memory, our results nicely parallel descriptions of how different kinds of memory support skilled performance by professional musicians. The 'learning' process of repetitive practice builds implicit memory of the piece and the separate explicit 'memorization' of the score likely supports the same kind of similar synergistic interaction reported here. If implicit memory application is disrupted at any time during performance (e.g., the 'fingers slip'), explicit knowledge allows for error recovery to enable completion of the performance. Single memory system theories cannot account for this description of skilled performance, but standard multiple memory systems models have not previously included a mechanism allowing for this interplay. Oversight of this kind of interaction in prior research on memory systems theory likely arises from a focus that has almost exclusively been on dissociating implicit from explicit memory. The difficulty in finding a pure dissociation has allowed persistent criticisms that the systems are not truly separate and independent, but that apparent dissociations between memory types reflect the fact that implicit learning is merely a weaker form or component of the general (explicit) memory processes. Our results support the distinction between memory types by showing the lack of benefit from explicit knowledge on standard task performance (Example 1). Examples 2 and 3 then go beyond this dissociation to show how these types of memory interact with findings that simply cannot be accounted for within a single system model.

Next, consider the following scenario: a high security facility employs a sophisticated authentication system to check that only persons who know a secret key, possess a hardware token, and have an authorized biometric can enter. Guards ensure that only people who successfully authenticate can enter the facility. Now, suppose a clever attacker captures a registered user. The attacker can steal the user's hardware token, fake the user's biometrics, and coerce the victim into revealing his or her secret key. At this point the attacker can impersonate the victim and defeat the expensive authentication system deployed at the facility.

So-called rubber hose attacks have long been the bane of security systems and are often the easiest way to defeat cryptography. The problem is that an authenticated user must possess authentication credentials and these credentials can be extracted by force or by other means.

The new approach described here is aimed at preventing rubber hose attacks using the concept of implicit learning from cognitive psychology. Implicit learning is believed to involve the part of the brain called the basal ganglia that learns tasks such as riding a bicycle or playing golf by repeatedly performing those tasks. Experiments designed to trigger implicit learning show that knowledge learned this way is not consciously accessible to the person being trained. An every-day example of this phenomenon is riding a bicycle: a person knows how to ride a bicycle but cannot necessarily explain how they do it. The next section gives more background of the relevant neuroscience.

Implicit learning presents a fascinating tool for designing coercion-resistant security systems. One example is user authentication where implicit learning is used to plant a password in the human brain that can be detected during authentication but cannot be explicitly described by the user. Such a system avoids the problem that people can be persuaded to reveal their password.

To use this system, participants would be initially trained to do a specific task called Serial Interception Sequence Learning (SISL), described in Section 2. Training is done using a computer game that results in implicit learning of a specific sequence of key strokes that functions as an authentication password. In the experiments, training sessions lasted approximately 30 to 45 minutes and participants learned a random password that has about 38 bits of entropy. Preliminary results discussed below suggest that after training participants cannot reconstruct the trained sequence and cannot even recognize short fragments of it.

To be authenticated at a later time, a participant is presented with multiple SISL tasks where one of the tasks contains elements from the trained sequence. By exhibiting reliably better performance on the trained task compared to untrained, the participant validates his or her identity within 5 to 6 minutes. An attacker who does not know the trained sequence cannot exhibit the user's performance characteristics measured at the end of training. Note that the authentication procedure is an interactive game in which the server knows the participant's secret training sequence and uses it to authenticate the participant. While user authentication is a natural application for implicit learning, authentication is just the tip of the iceberg.

Threat Model.

The basic system is designed for locally authenticating users. For example, consider authentication at the entrance to a secure facility where a guard can ensure that a real person is taking the test without the aid of any electronics. To fool the authentication test the adversary is allowed to intercept one or more trained users and get them to reveal as much as they can, possibly using coercion. Then the adversary, on his own, engages in the live authentication test and his goal is to pass the test.

One approach is to be used with a password system and is not designed to resist eavesdropping attacks such as shoulder surfing during the authentication process. The approach is to design a challenge-response protocol using implicit learning.

Benefits Over Biometric Authentication

The trained secret sequence can be thought of as a biometric key authenticating the trained participant. However, unlike biometric keys the authenticating information cannot be surreptitiously duplicated, and participants cannot reveal the trained secret even if they want to. In addition, if the trained sequence is compromised, a new identifying sequence can be trained as a replacement, resulting in a change of password. The ability to periodically "change password" is not possible with traditional biometrics.

Research Approach

Three research directions can be pursued that build upon prior initial results. First, design learning tasks for learning combinatorial rules rather than fixed sequences can be employed. Proving that the brain can deduce rules by implicit learning from sample data can open the door to challenge-response type protocols where users are presented with a new sequence every time they try to authenticate. This new sequence is generated at random according to the trained rule. Since the knowledge is implicit, users cannot be compelled to reveal the rules they learned.

Second, approaches beyond motor learning as in the SISL task and authenticate users using EEG data (electrical activity along the scalp) collected during the authentication test can be used. Recognition of knowledge gained by implicit learning can generate detectable EEG signals that can be used to authenticate trained users. This approach can greatly increase the accuracy and speed of the authentication test.

A few user studies were performed using Amazon's Mechanical Turk show that implicit learning can be used for authentication and, moreover, that trained users are unable to recognize the sequences they learned. The brain can be able to represents the learned implicit knowledge and to further demonstrate no conscious recognition of the learned sequences.

An Overview of the Human Memory System

The difference between knowing how to perform a well-learned skill and being able to explain that performance is familiar to anyone who has acquired skilled expertise. This dissociation reflects the multiple memory systems in the human brain. Memory for verbally reportable facts, events and episodes depends on the medial temporal lobe memory system (including the hippocampus). Damage to this system due to stroke, Alzheimer's disease neuropathology, or aging leads to impairments in conscious, explicit memory. However, patients with impairments to explicit memory often show an intact ability to acquire new information implicitly, including exhibiting normal learning of several kinds of skills. The types of learning preserved in memory-disordered patients are those learned incidentally through practice: even in healthy participants the information thus acquired cannot be easily verbally described.

Several decades of experimental cognitive psychology have led to the development of tasks that depend on this type of implicit, non-conscious learning system. These tasks typically present information covertly with embedded structure in a set of experimental stimuli. Although participants are not attempting to learn this structure, evidence for learning can be observed in their performance.

The covertly embedded information often takes the form of a statistical structure to a sequence of responses. Participants exhibit improved performance when the responses follow this sequence and performance declines if the structure is changed. The improvement in performance can occur completely outside of awareness, that is, participants do not realize there is any structure, nor can they recognize the structure when shown. The lack of awareness of learning indicates the memory system supporting learning is not part of the explicit, declarative memory system and instead is hypothesized to depend on the basal ganglia and connections to motor cortical areas.

Less is known about the information processing characteristics of the cortico-striatal memory system operating in the connections between the basal ganglia and motor cortical areas. Most prior research has examined learning of simple structures with small amounts of information, typically repeating sequences of actions 10-12 items in length. However, more recent studies have found that long, complex sequences can be learned fairly rapidly by this memory system and that learning is relatively unaffected by noise. The ability to learn repeating sequences that are at least 80-items long relatively rapidly and the fact that this training can be hidden within irrelevant responses (noise) during training suggests an intriguing possibility for covertly embedding non-reportable cryptographic data within the cortico-striatal memory system in the human brain.

Classic biometric features derived from a user's physiological and behavioral characteristics (e.g., fingerprints, retina scans, keystroke dynamics, gait) are fixed over time and difficult to change when exposed. The disclosed methods differ from these by enabling quick training of new random patterns as needed. Moreover, the disclosed approach enables key revocation and multiple keys per user for different systems.

Two related studies of passwords that cannot be recalled looked at learning images or words. The SISL task, which focuses on learning character sequences, has more combinatorial flexibility that can help reduce conscious learning.

Deniable Encryption.

In the context of encryption, deniable encryption enables a user who encrypts a message to open the ciphertext in multiple ways to produce different cleartexts from the same ciphertext. Such systems enable a user to reveal an encryption key, which produces a document that contains plausible cleartext, but which is different from the actual document the user wishes to protect. This technique protects encrypted documents but does not apply to authentication credentials. Further, a properly motivated user of deniable encryption could choose to reveal the correct decryption key, enabling the coercive adversary offline access to all versions of the document.

In the disclosed approach, the user cannot, even if strongly motivated, reveal to another any information useful for an adversary to replicate the user's access without the user being present.

Coercion Detection.

Some systems attempt to prevent coercion by detection of duress, including video monitoring, voice stress detection, and skin conductance monitoring. The idea here is to detect by out-of-band techniques the effects of coercion. These methods can complement the disclosed implicit learning approach to improve system robustness.

Figure 7:
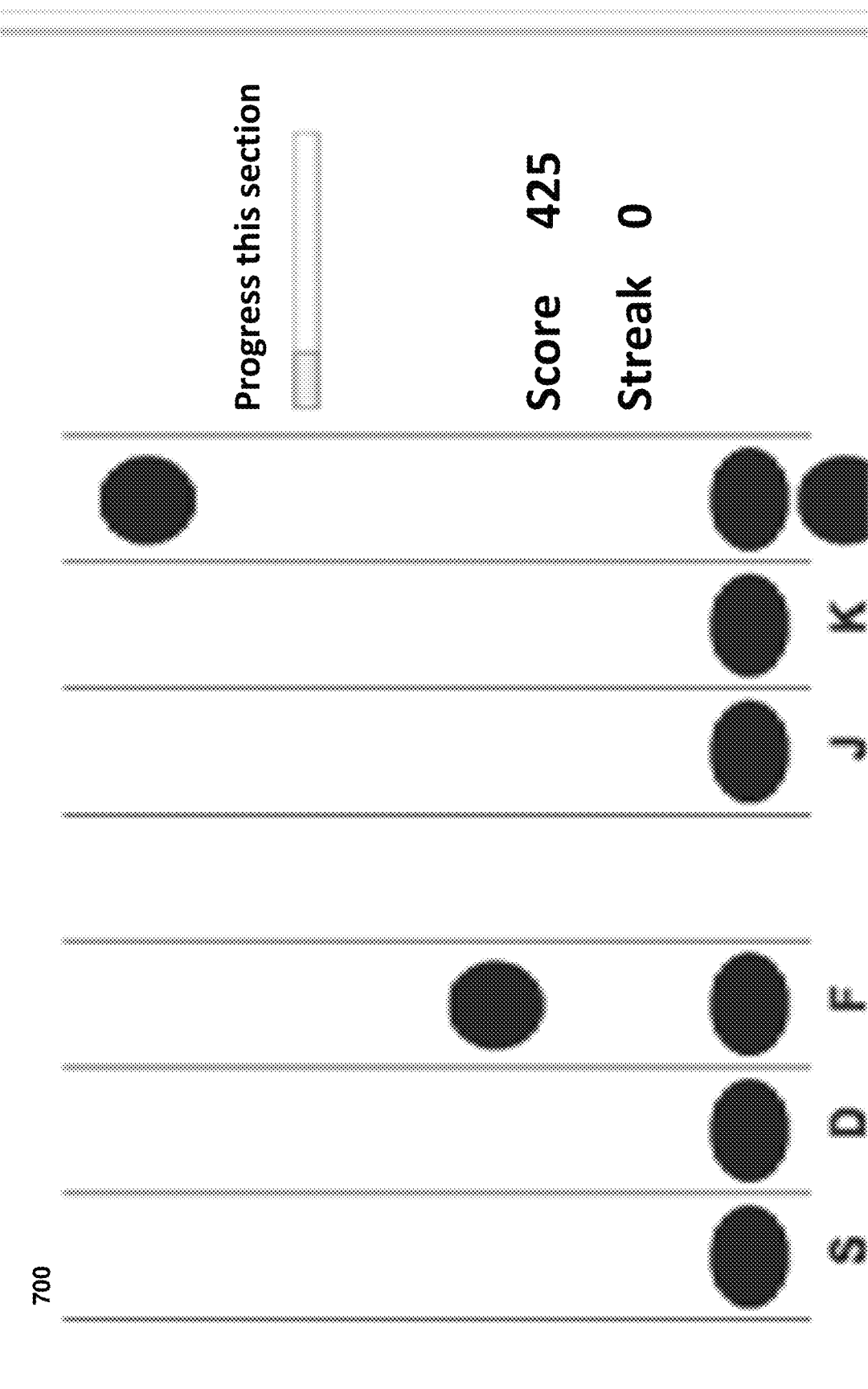
FIG. 7 illustrates a diagram of an embodiment of an example of a SISL task in progress.

FIG. 7 illustrates a diagram 700 of an embodiment of an example of a SISL task in progress.

The SISL Task and Applet

The execution of the Serial Interception Sequence Learning (SISL) task is central to the authentication system that was developed. Here, the SISL task is employed in the context of the human memory system in order to provide background for describing the disclosed design and practical experiments.

Originally introduced in, SISL is a task in which human participants develop sensitivity to structured information without being aware of what they have learned. The task requires participants to intercept moving objects (circles) delivered in a pre-determined sequence. Initially each object appears at the top of one of six different columns and falls vertically at a constant speed until it reaches the "sink" at the bottom, at which point it disappears (see FIG. 7). The goal for the player is to intercept every object as it nears the sink. Interception is performed by pressing the key that corresponds to the object's column when the object is in the correct vertical position. Pressing the wrong key or not pressing any key results in an incorrect outcome for that object. In a typical training session of 30-60 minutes, participants complete several thousand trials and the order of the cues follows a covertly embedded repeating sequence on 80% of trials. The game is designed to keep each user at (but not beyond) the limit of his or her abilities by gradually varying the speed of the falling circles to achieve a hit rate of about 70%. Knowledge of the embedded repeating sequence is assessed by comparing the performance rate (percent correct) during times when the cues follow the trained sequence to that during periods when the cues follow an untrained sequence.

All of the sequences presented to the user are designed to prevent conspicuous, easy to remember patterns from emerging. Specifically, training as well as random sequences are designed to contain every ordered pair of characters exactly once with no character appearing twice in a row, and thus the sequence length must be 6×5=30 when six columns (characters) are used. The result is that while the trained sequence is performed better than untrained sequence, the participant usually does not consciously recognize the trained sequence. In order to confirm this in experimental work, after SISL, participants are typically asked to complete tests of explicit recognition in which they specify how familiar various sequences look to them. The results of the experiments are described below.

The SISL task plants a random 30-long secret sequence in the participant's brain that has about 38 bits of entropy. To see why, recall that the sequence contains 30 characters over the set S={s, d, f, j, k, l}, has no repeating characters, and every pair of characters appears exactly once. These sequences correspond to Euler cycles in a certain 6-node directed graph (i.e. cycles where every edge appears exactly once) and the number of such cycles can be counted using the classic BEST theorem. Plugging in the parameters shows that the total number of such sequences is # keys=64·246≈$2^{37.8}$, and hence the learned random secret has about 38 bits of entropy, far more than the entropy of standard memorized passwords.

Initial Experiments

The SISL task is delivered to users as a Flash application via a web browser. Participants navigate to a web site (e.g. www.brainauth.com) and are presented with a consent form. Once they agree to participate, the applet downloads a random training sequence and starts the game. Upon completion of the training and test trials, the explicit recognition test is administered, and results are uploaded to a server.

An important measure of performance to evaluate whether the user knows the sequence is the rate of correct responses during SISL performance when the cues are following the trained sequence compared with when the cues do not. Expression of implicit sequence knowledge occurs by a higher percentage of correct of responses during the trained sequence. However, for this measure to be effective, the task must be challenging enough to produce error rates of at least 20-30%. The speed at which the cues move is adjusted adaptively during task performance to guarantee a reasonable error rate. If participants are responding at over 75% accuracy the cue velocity increases, leading to more errors. If participants are responding at under 50% accuracy, the cue velocity decreases to keep the task from becoming frustratingly difficult. Performance is evaluated every 12 trials and the speed adjustment is made in 5% increments.

During training, participants complete blocks of 108 trials that contain 3 repetitions of the sequence plus an 18-trial non-repeating segment (also constructed to the same constraints as the repeating sequence). The position of the 18-trial segment is randomly determined on each block and serves both to allow for assessment of sequence learning during training by comparing performance levels during the repeating sequence and the non-repeating segment, but also to somewhat mask the repeating sequence.

Figure 8:
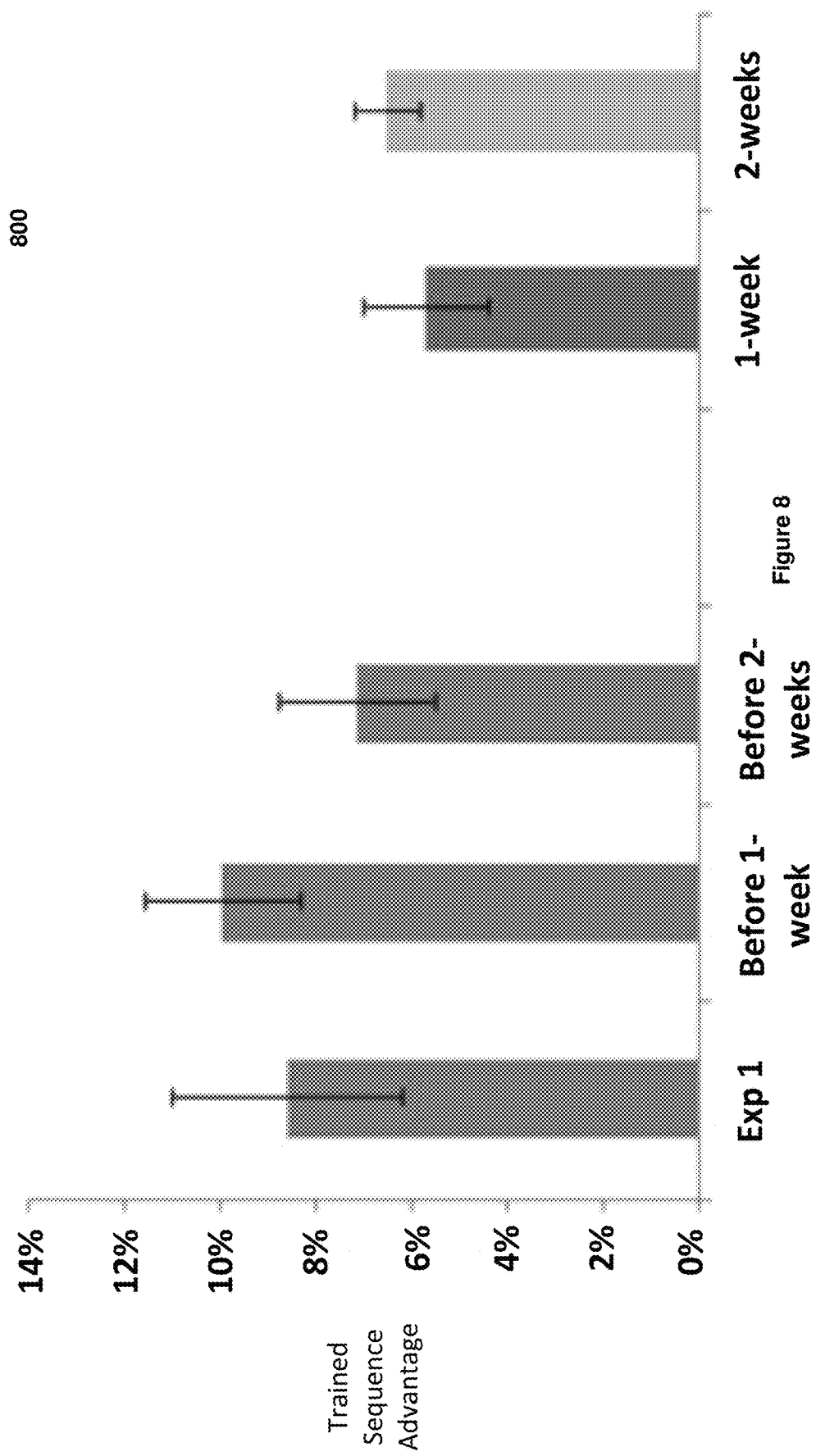
FIG. 8 illustrates a diagram of an embodiment of a comparison of participant reliable sequence knowledge on immediate assessments.

FIG. 8 illustrates a graph 800 of an embodiment of a comparison of participant reliable sequence knowledge on immediate assessments. The graph 800 shows the trained sequence advantage in % vs week time frames.

Example 4

The first preliminary study established that reliable implicit skill learning could be obtained for a 30-item sequence sufficient to validate the identification of individual participants. A group of 46 participants were initially recruited and 36 of these completed the task. An additional 6 participants were eliminated due to non-compliance.

Training: Each participant completed a total of 3780 trials of SISL training with an embedded 30-item repeating sequence (each participant received a different sequence during training). This training typically took 30-40 minutes to complete. Sequence-specific learning is measured during training by the difference in performance between the repeating sequence and the random non-repeating segments. As this difference increases, it reflects a greater performance advantage for the trained sequence.

Testing: Training was followed by a 540-trial test that assessed whether it could reliably be validated that each participant learned their embedded repeating sequence. During this test, the training sequence and two novel foil sequences were shown 6 times each (in two blocks of 3 repetitions with blocks randomly ordered). Performance on the trained sequence was contrasted with performance on the two foil sequences to construct a sequence knowledge assessment score.

After the SISL training and test, participants are made aware that there was a repeating sequence during the task. They are then administered an explicit recognition test where they are presented with five different sequences, the trained sequence and 4 foils. For each, participants indicate familiarity on a scale from 0 to 10.

Results. On the post-training assessment, participants were reliably more accurate on the trained sequence than the foil sequences performing 11.1% better (SE 1.3%), demonstrating that they had learned their sequence (t(29)=8.7, p<0.001), where SE measures statistical error and t values provide statistical t-test results. This experiment is represented in the left most column of FIG. 8. On the recognition test, participants rated the target sequence at 6.8 (from 0 to 10) and the foils at 5.3, indicating only a minimal level of recognition for their trained sequence.

Example 5 and 6—Recall Over Time

In this experiment, participants' memory was assessed for the trained sequence when tested a week after training to evaluate how well the trained sequence could be performed at a delay. Participants trained for 3780 trials, just as in Example 4 1 and completed a test at the end of training. One week later, participants returned to the site and completed a second assessment. Prior to the second assessment, participants completed a warm-up block of 180 trials that also served to provide an opportunity to adaptively adjust the speed of the task to the appropriate level.

A group of 45 participants were recruited initially and completed the first session. A subset of these, 32 participants completed both the initial and 1-week delay test and an additional 2 of these were eliminated due to non-compliance.

Results. Learning during training was similar to Example 4 1 and test performance, shown in FIG. 8 second column from the left, indicated a 9.8% advantage (SE 1.7%) for the trained sequence. One week later there was still a reliable advantage in performance for the trained sequence, 6.1% (SE 1.3%, t(29)=4.6, p<0.001) although the advantage was less than seen immediately following training.

In the third example, the delay was extended to two weeks to verify that minimal further forgetting of the trained sequence would occur. Participants exhibited good retention of sequence knowledge at the 2-week delay (FIG. 8), showing a 6.4% (SE 0.7%) sequence advantage.

Assessment Reliability. Reliability is evaluated for individual participants using a $\chi 2$ analysis to compare percent correct performance during the trained sequence and foils. This statistical analysis produces a rigorous test for establishing that the user has acquired significant knowledge of the sequence. The percentage of participants meeting stringent statistical criteria varies from 50% to 70% across experiments and is somewhat lower when testing is 1-2 weeks after training (47%-60%). Increasing the reliability of this type of assessment is a goal of the research using both behavioral techniques to strengthen the learning, increase the reliability of test and incorporate additional physiological measures such as EEG to enhance assessments of knowledge.

Example 7—Assessing Fragment Recall

One of the potential attacks on the disclosed system involves a malicious party profiling the legitimate user's knowledge and using that information to reverse engineer the trained sequence to be able to pass the authentication test. Although the number of possible trained sequences is too large to exhaustively test on any single individual each sequence is constructed according to known constraints and knowledge of subsequence fragments might enable the attacker to either reconstruct the original sequence or enough of it to pass an authentication test.

The training sequences are constrained to use all 6 response keys equally often, so analysis of individual response probabilities cannot provide information about the trained sequence. Likewise, all 30 possible response key pairs (6*5=30, since keys are not repeated) occur equally often during training meaning that bigram frequency also provides no information about the trained sequence. However, each 30-item sequence has 30 unique trigrams (of 150 possible). If the specific training trigram fragments could be identified, the underlying training sequence could be reconstructed.

An attack based on this information would be to have a trained user perform a SISL test that contains all 150 trigrams equally often. If the user exhibited better performance on the 30 trained trigrams than the 120 untrained, the sequence could be reconstructed. This attack would weaken the method's relative resistance to external pressure to reveal the authentication information. However, while the sequence information can be determined at the trigram level it is not known if participants reliably exhibit sequence knowledge when performing such short fragments. In Example 4, the performance on this type of trigram test to assess whether the sequence information could be reconstructed is evaluated.

Participants were again recruited through Mechanical Turk and completed the same training sessions used in Examples 4 and 5. At test, participants performed a sequence constructed to provide each of the 150 trigrams exactly 10 times by constructing ten different 150-trial units that each contain all possible trigrams in varying order. Performance on each trigram was measured by percent correct as a function of the current response and two responses prior.

Results. Participants did not exhibit their trained sequence knowledge on this type of test, indicating that their sequence knowledge cannot be attacked with a trigram-based method. More specifically, for each user, the average percent correct measurements for the 30 trained-sequence trigrams can be compared to those for the 120 remaining trigrams. The 34 participants averaged 73.9% correct (SE 1.2%) for trigrams from the trained sequence and 73.2% correct (SE 1.1%) for the rest. This small difference indicates negligible recognition of trigrams from the trained sequence.

Figure 9:
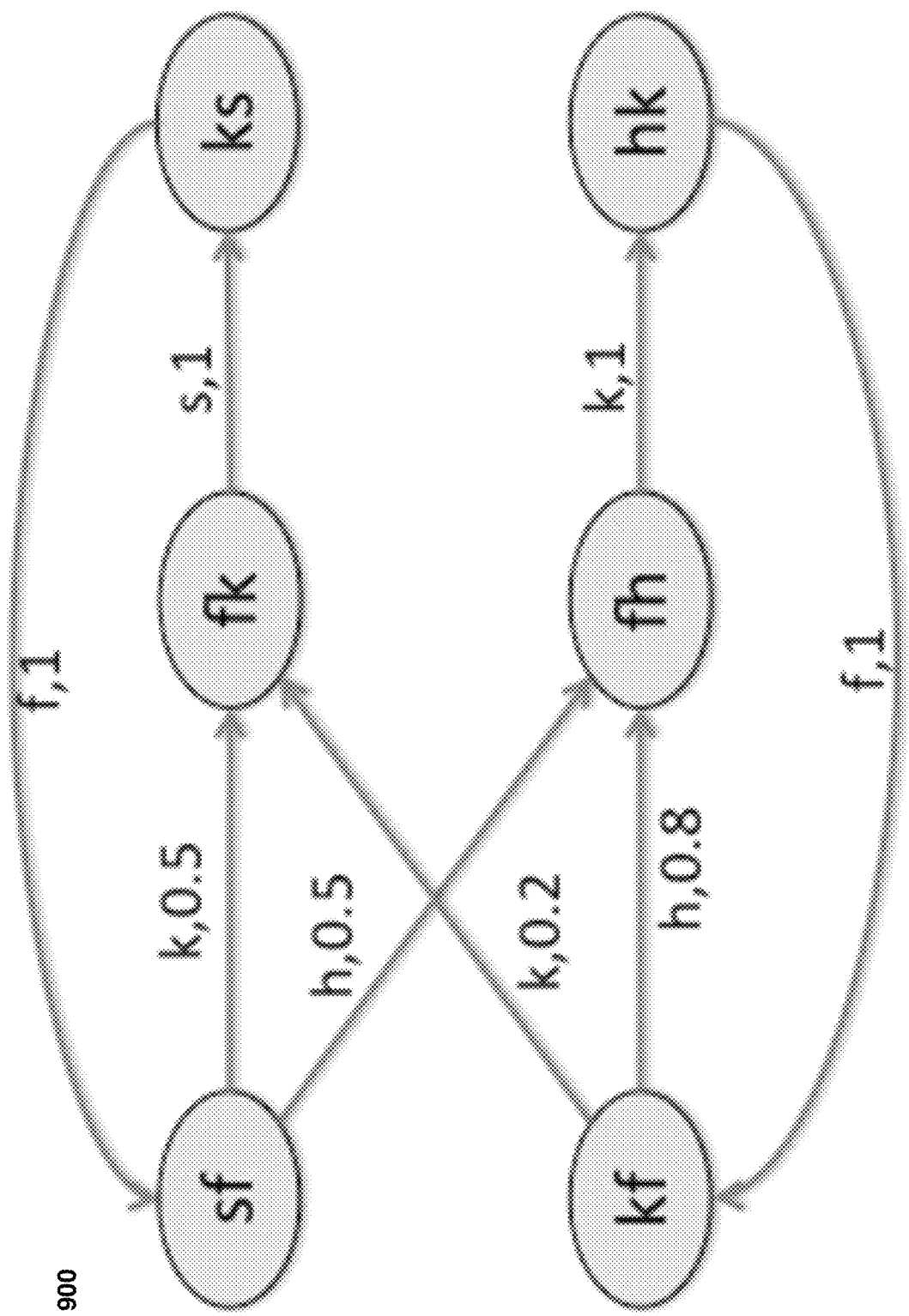
FIG. 9 illustrates a diagram of an embodiment of a sample Markov chain for generating sequences over $\{s, f, h, k\}$.

FIG. 9 illustrates a diagram 900 of an embodiment of a sample Markov chain for generating sequences over {s, f, h, k}.

Learning Rules

The SISL task gives a natural way to plant a password in a person's brain that can later be used for authenticating that person using a password-like protocol. However, as with password-based protocols, the resulting authentication system is vulnerable to eavesdropping that can reveal the person's password. The standard defense against eavesdropping and more general active attacks is challenge-response authentication: the server provides the user with a random challenge, the user responds to the challenge, and the server verifies the response. For security, it is important that given the response to a few challenges, an attacker cannot predict a valid response to some other random challenge.

The question then is whether implicit learning can be used for coercion-resistant challenge response authentication. In the SISL training phase, the participant would be trained to perform well on sequences generated from a certain model, such as a Markov chain with few states. If successful, the participant's basal ganglia would learn the abstract model (e.g. the Markov chain) from the training samples. Later, at authentication time, the participant is presented with a new fresh sequence generated at random according to the training model. A trained participant performs better on this new sequence than on a random sequence and pass the authentication test. However, a human attacker who has not been trained on the model will not be able to differentiate a sequence generated using the model from a truly random sequence and will fail the authentication test as a result. As with the basic password-like protocol, the participant has no conscious knowledge of the model he was trained to learn and cannot reveal it when coerced.

The approach outlined in the previous paragraph requires that participants' brains deduce the abstract model from several training samples. Small Markov chains, such as the one shown in the diagram 900 of FIG. 9, provide a natural family of models for training participants. During the training phase the participant will be trained on several random sequences generated using the model. During authentication, the participant will be tested on a fresh sequence generated at random using the model. This fresh test sequence functions as a random challenge and the participant's relative performance on this challenge is the response.

At this time, it is not certain whether the mechanism of implicit learning in the human brain is capable of learning a Markov chain such as the one in FIG. 9. User studies can be designed that show knowledge acquisition without conscious recognition. The biggest unknown is how implicit knowledge is represented in the human brain. If the representation is rich enough to include abstract Markov models, then this limited challenge-response mechanism will successfully authenticate users. Other models can be employed to test whether the basal ganglia is capable of learning, such as simple grammars and others. Knowledge gathered from the user studies can be used to provide insight on how the brain represents implicit knowledge, where that understanding can be then translated into authentication protocols.

These models can be sufficiently rich to provide security in an eavesdropping attack scenario. That is, where the attacker learns the abstract model by eavesdropping on a small number of authentication transcripts. It seems plausible that the human brain can learn sufficiently complex models that each authentication transcript will only expose a small fragment of the model (e.g. a subset of the edges in the Markov chain). An attacker will need to eavesdrop on many transcripts in order to reconstruct the entire model needed to fool the authenticator.

Overall, this work can increase understanding around how implicit knowledge is represented in the brain and can enable design coercion-resistant authentication systems that are more secure to eavesdropping than basic fixed-sequence approach.

Beyond Keyboard-Based Authentication

The core idea behind the disclosed approach to authentication is that the key identifying information is stored within the motor planning regions of the brain. In studies, behavioral measures of SISL performance are used to verify knowledge of the key information. However, because the information is demonstrated when specific brain networks are activated, it is also possible to use neurophysiological measures of knowledge retrieval as part of the verification process. Tools for collecting electroencephalographic (EEG) information from human participants are becoming increasingly available, portable, and inexpensive. EEG signals reflect time-series patterns of neural activity recordable at various locations on the scalp as cognition occurs and these data can be used to discriminate the brain's response to known and unknown information. The inventors have been studying these neurophysiological signals for many years as part of their studies of human memory. The new application of these methods explores techniques for strengthening the verification method by combining temporally precise EEG measures of neural activity with sophisticated performance measures.

Two approaches can be employed to identify the most reliable way to verify sequence knowledge in participants while performing the SISL task. After learning, neurophysiological changes can be detectable in attention and perceptual processes as well as the fluidity of motor control during performance. To examine changes in motor processing, event-related desynchronization (ERD) measures over motor cortex can be used. ERD changes with learning and can provide objective evidence that the user is performing a known sequence. To examine changes in attention processing, frequency-tagging methods and analysis of steady state visual evoked potentials (SSVEPs) can be used. This method involves modifying the stimuli to flicker rapidly (e.g., at 20 Hz) so that the degree of attention focused on the cues can be reflected in increased power in the SSVEP at double the flicker frequency. By virtue of these known neurophysiological phenomena, it can be possible to identify differential SSVEP power when comparing EEG during the trained sequence versus untrained sequences.

The aim of these experiments is to provide additional measures of user knowledge that can be used in conjunction with behavioral performance measures. A combined measure should be more sensitive and specific, producing higher authentication rates with fewer false positives and also providing additional protection to countermeasures attempting to foil the authentication test.

EEG Methodology

EEG experiments can be conducted with 64-channel systems (example: NeuroScan and a BioSemi system). Brain activity can be measured using the standard methods used extensively in prior publications. IRB-approved informed consent procedures and compensate participants are used. Participants in good health, with normal or corrected-to-normal eyesight, and not on psychoactive medications, can be tested individually inside an electrically shielded and sound-attenuating chamber equipped with a two-way intercom system and camera. Tin electrodes in an elastic cap are used for scalp EEG locations and mastoid reference (computed offline) using standard procedures. The studies use high-precision laboratory data collection techniques to establish value of this approach. Further development can extend the approach to more portable methods. For data analysis, measured electrical activity is amplified with a band pass of 0.05 to 200 Hz, and digitized at 500 Hz. Commercial and customized software is used for data acquisition, artifact rejection, and all analysis steps including analyses in the frequency domain for ERP and SSVEP quantification.

EEG Study 1 Approach

A group of 20 participants is tested in the Reber and Paller laboratories at Northwestern University. Each participant completes 3780 trials of SISL training to learn a 30-item repeating sequence via the same basic methods as the preliminary experiments except that the learning is not be done online. After learning, participants receive a performance test of sequence knowledge while EEG data are collected in order to measure the ERD during the known sequence and novel sequences. During this test participants complete a total of 30 90-trial blocks of the trained sequence and 60 blocks of untrained sequences. Breaks are given every 540 trials (5 m) and the total test time is expected to take 75 minutes to administer. After computing sensitivity of these methods, it can be determined if a shorter testing period can be used to provide adequate detection statistics.

The ERD can be quantified in the upper alpha and beta frequency bands during test performance. Peak alpha frequency is calculated for each individual in order to determine the cut-off for these bands, which is a standard procedure for ERD analyses in other experimental contexts. It is expected that the ERD can be reduced for the trained sequence compared to the untrained sequences. Different values can be calculated to yield a measure of differential ERD that can provide a measure of each individual. Reliability can be calculated using boot-strapping methods. The ERD/EEG measures of sequence knowledge can be compared to estimates of the strength of sequence knowledge obtained by the previously used behavioral measures as well as evaluated in combination. It is expected that the successful identification rate can be higher for the combined measure than each measure individually.

EEG Study 2 Approach

Participants learn a 30-item repeating sequence using the same approach as in Example 1. During the test of sequence knowledge, the presentation of stimuli can be slightly modified so that the moving cues are presented on screen as flickering at a rate of 12.5 Hz. The flickering cues create a SSVEP over visual cortex that can be reflected at 25 Hz. The power in this frequency band can be used as a marker of attention directed to the cues during performance of the SISL task. Given learning-based expectations that guide attention to the rapid emergence of different stimuli, the strength of the SSVEP is expected to be relatively higher during the trained sequence. Accordingly, this signal can be used to supplement the behavioral difference to verify that the user knows the trained sequence.

Behavioral Study 1 Approach

A simple way to increase the reliability of sequence learning in each participant (user) is to increase the amount of training used to learn the repeating sequence. In Examples 1-4, participants only completed around 30-40 m of training to learn the repeating sequence. To improve the rate of successfully identifying individual participants with a stringent identification criterion, training completed over 2 sessions and assess learning at a 1-week delay can be evaluated.

Participants complete 10 540-blocks of training (5400) trials in each of two sessions separated by at least 24 hours. One week after the second session, participants return and complete the 1080 assessment test used in Example 3. It is expected that a very high rate of participants can exhibit reliable knowledge under these conditions (~90%). In addition to nearly tripling the amount of training, sequence knowledge is often found to consolidate overnight and therefore training over multiple days may provide additional benefit to creating a strong and durable memory trace.

Behavioral Study 2 Approach

In Example 4, it was noted that testing participants' sequence knowledge with the shortest possible fragments (trigrams) did not lead to reliable expression of the trained information. This was somewhat surprising as most models of implicit sequence learning hypothesize that sequence learning works bottom-up to identify increasingly longer contingencies among items in the sequence. This result indicates that the sequence cannot be easily reverse engineered from performance, which helps protect from attack, but it is likely that longer fragments can be used to assess sequence knowledge and this would open up new avenues for improving identification methods. As seen in preliminary Example 4, increasing the length of the test increases reliability. But since the standard test involves concentrated repetitions of a small number of sequences, it is likely that participants can start to become aware of the 3 sequences being used. In addition, with only 3 sequences in the test, the test becomes vulnerable to attack since there is a 1 in 3 chance that performance on the trained sequence is highest even for an attacker. A knowledge assessment based on fragments can more effectively hide the structure of the repeating sequence and the foils. It can also allow for tests that only expose parts of the key sequence information.

The key empirical question is to identify an effective length of the fragments to use at test. To do this, participants complete the same training (3780 trials) as in the preliminary experiments but after training, the assessment test is to be constructed as a sequence of fragments drawn from the trained sequence and the two foils. Fragments can be constructed from the trained and foil sequences and randomly ordered into a single continuous sequence with the constraint that the same response never occurs twice in a row. Knowledge can be identified through performance measured as the difference in correct responding for the trained and untrained fragments (with performance only counted for the elements after the 3rd item within the fragment since the first two are not predictable). Fragments of length 4, 5 and 6 can be evaluated across test conditions of comparable length (1600-1800 trials). This may require different numbers of tests each fragment (3-5 repetitions) but can allow for evaluation of the ability to identify the fragments from the trained sequence in similar amounts of testing time. Relatively large sample sizes (100 participants/condition) can be used to assess the reliability of this approach. In addition to enhancing the identification methodology, this experiment can also provide insight into the underlying mechanisms supporting human perceptual-motor sequence learning.

Figure 10:
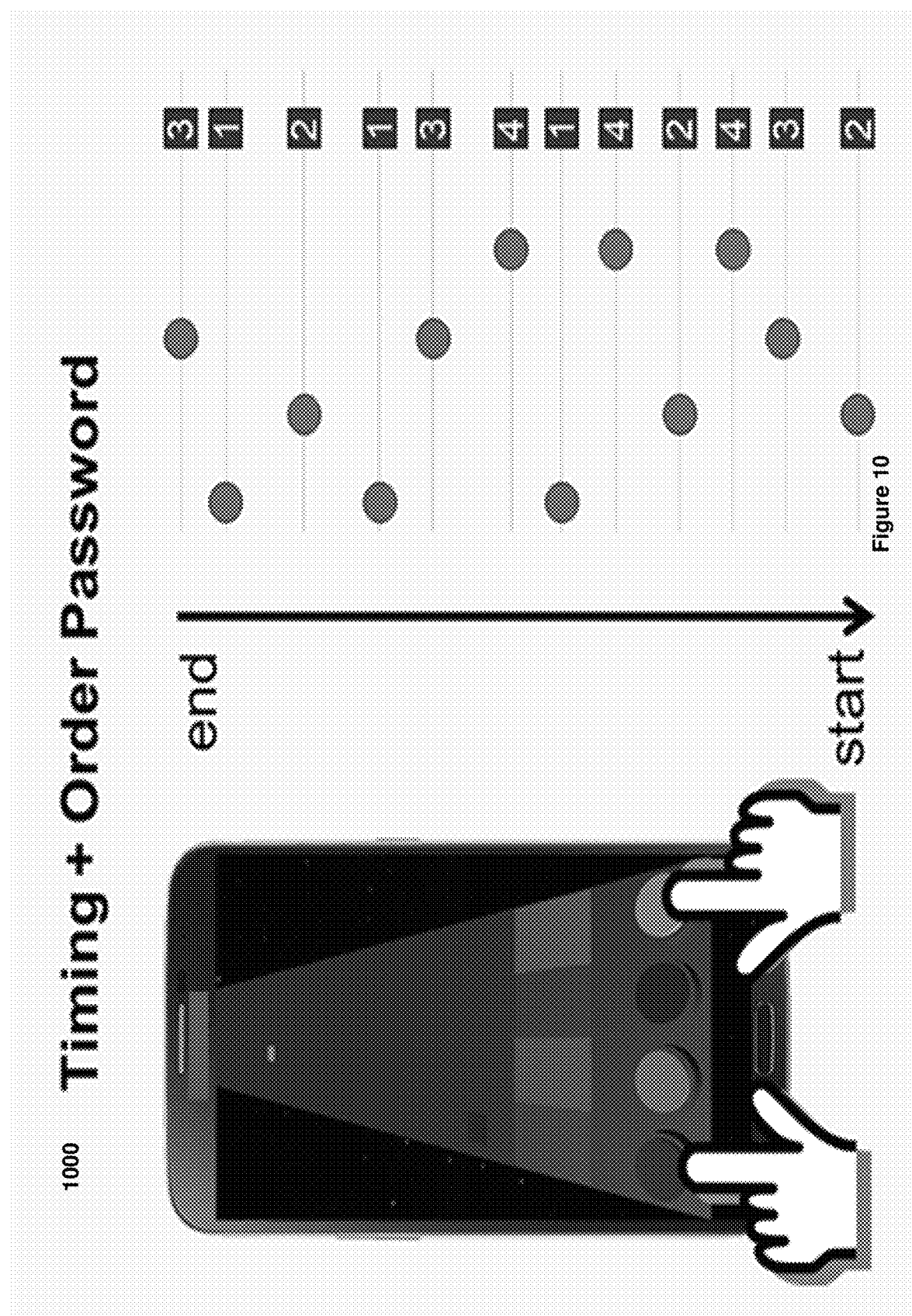
FIG. 10 illustrates a diagram of an embodiment of game applet used along with timing example and order sequence password.

FIG. 10 illustrates a diagram 1000 of an embodiment of game applet used along with timing example and order sequence password. As shown, the timing module and training module cooperate to implement an example of time and ordering password. The image on the right shows the game applet used on a mobile phone, along with an example timing and order sequence password. During training, users perform the sequence until it is stored as a motor program, and then when they play the game later, numerous sequences/passwords can be presented to them, and tell who they are based on their performance. The sequences include training and/or extraction of a cover message, the hidden message, and the password. Of note, any response where the little square is within the target zone is marked as correct. For example, Password performance based on percentage correct performance can be assessed.

FIG. 11 illustrates a diagram 1100 of an embodiment of a comparison of time and order password responses where the image on the right shows the presence of steganography bias. FIG. 11 shows a comparison between time and order password on the left and with detection of steganography bias on the right. For steganography, a secondary procedure can be used, such as an auditory module, to bias the errors in the password responses so that responses are still correct (made within the correct timing window) but are biased to be either early or late in order to store bits of information. As seen in the right image, the ghost/transparent circles represent ideal responses, and the dark circles represent the biased response timings. The same comparison of time and ordered responses can be made for the cover message and the hidden message.

Figure 12:
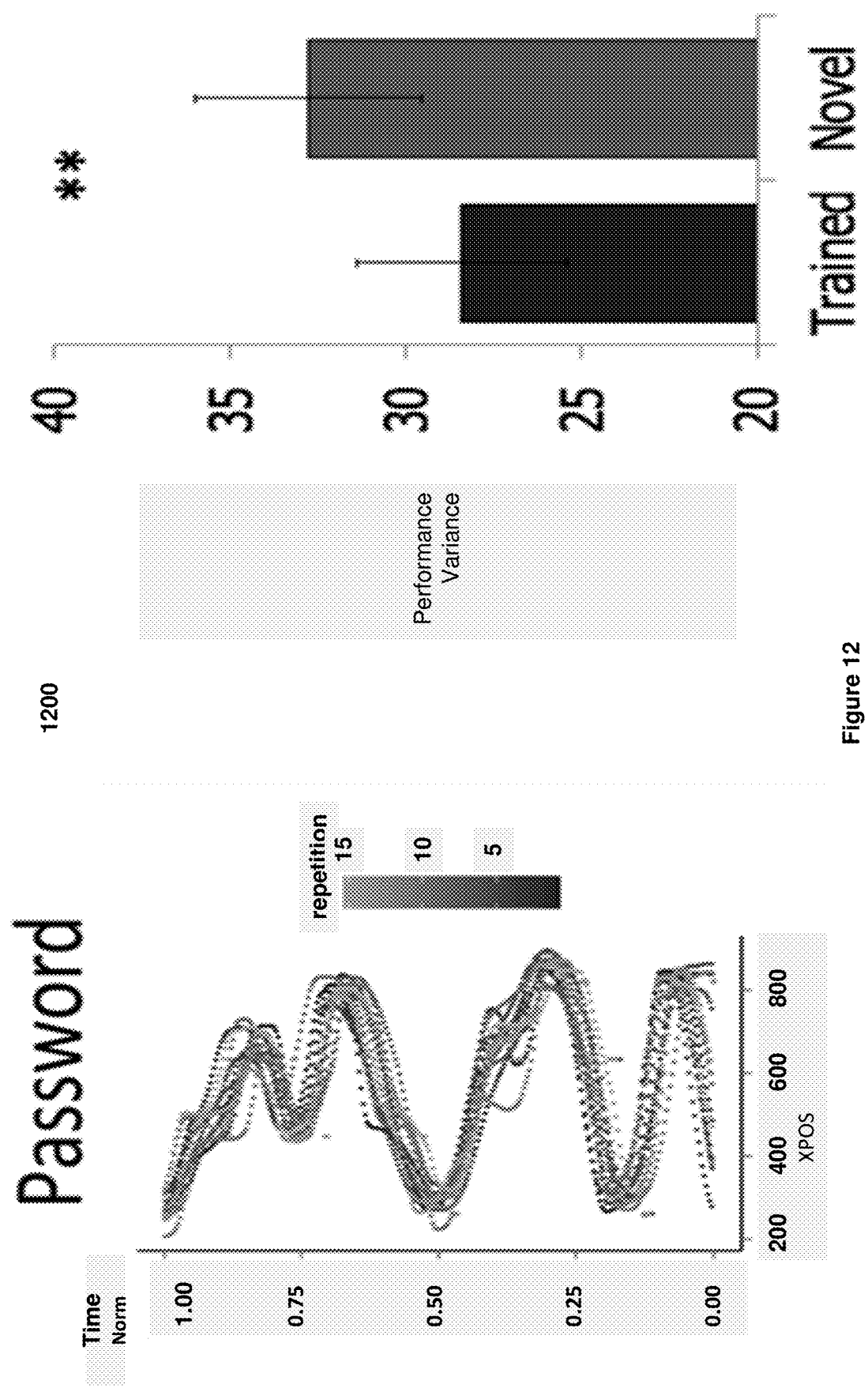
FIG. 12 illustrates a diagram of an embodiment of relevance of error information in perceptual motor sequence learning.

FIG. 12 illustrates a diagram 1200 of an embodiment of relevance of error information in perceptual motor sequence learning. FIG. 12 shows relevance of error information in perceptual motor sequence learning. The image on the left shows multiple traces of a password (or cover message) being produced. The figure on the right shows the regularity/reliability metric, assessed using a dynamic time warping analysis. Critically, this reliability metric, which is based on password error, is orthogonal from accuracy. In other words, the error is consistent, and this is the signal being biased in order to embed a hidden message with its secret into the cover message.

Network

Figure 13:
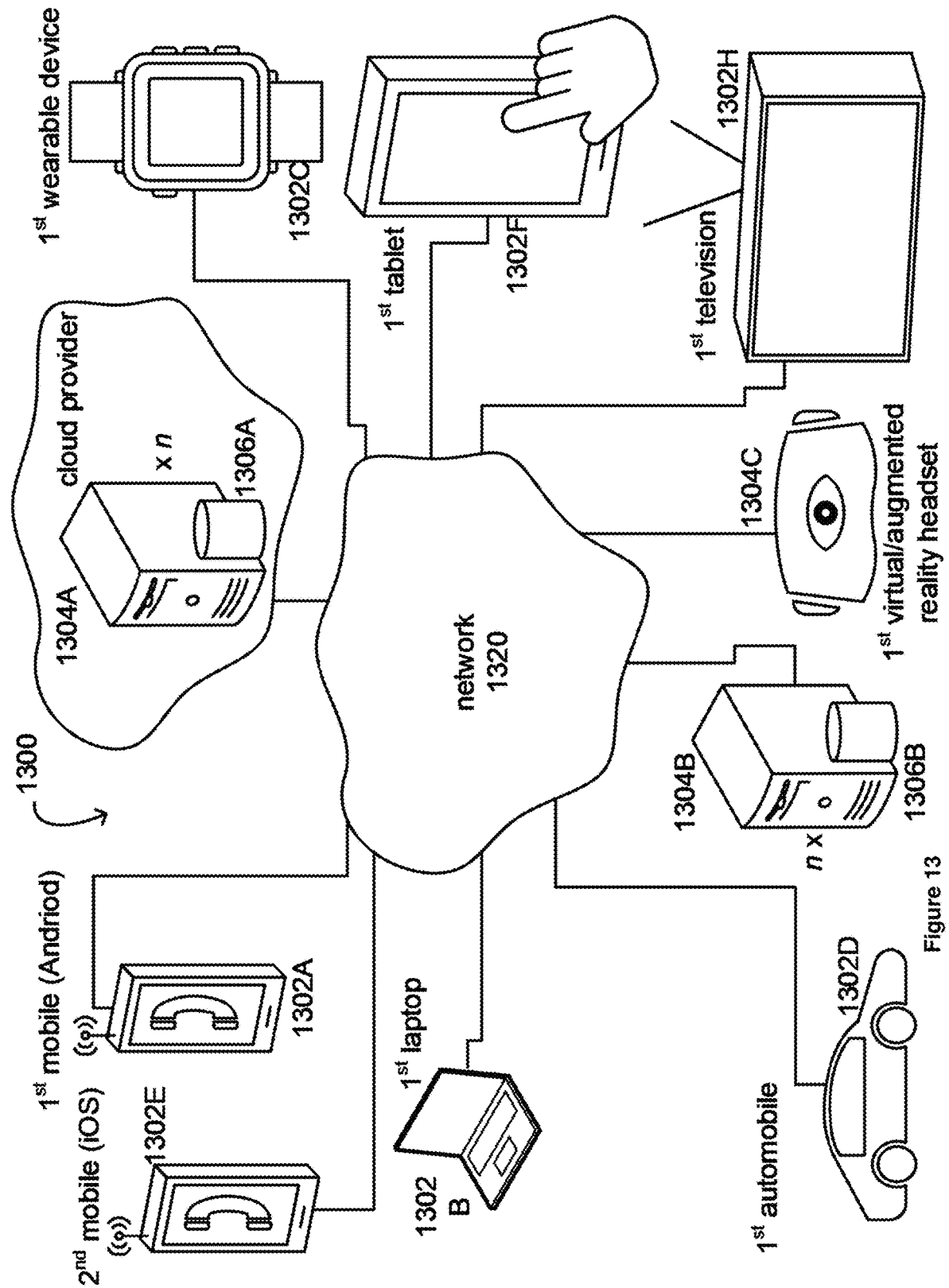
FIG. 13 illustrates a diagram of a number of electronic systems and devices communicating with each other in a network environment in accordance with an embodiment of the machine to assist in steganography for the animal.

FIG. 13 illustrates a diagram of a number of electronic systems and devices communicating with each other in a network environment in accordance with an embodiment of the machine to assist in steganography for an animal.

The network environment 1300 has a communications network 1320 that connects server computing systems 1304A through 1304B, and at least one or more client computing systems 1302A to 1302H. As shown, there may be many server computing systems 1304A through 1304B and many client computing systems 1302A to 1302H connected to each other via the network 1320, which may be, for example, the Internet. Note, that alternatively the network 1320 might be or include one or more of: an optical network, a cellular network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). Note, both functions may be in a single communicating device, in which case the client-server and server-client relationship may be viewed as peer-to-peer. Thus, if two systems, such as the client computing system 1302A and the server computing system 1304A, can both initiate and respond to communications, their communication may be viewed as peer-to-peer. Additionally, server computing systems 1304A-1304B also have circuitry and software to communication with each other across the network 1320. Each server computing systems 1304A to 1304B may be associated with one or more databases. Each server may have one or more instances of a virtual server running on that physical server and multiple virtual instances may be implemented by the design. A firewall may be established between a client computing system 1302C and the network 1320 to protect data integrity on the client computing system 1302C. Each server computing system 1304A-1304B may have one or more firewalls.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud-based site is given a virtual amount of dedicated space and bandwidth in the cloud. Cloud applications can be different from other applications in their scalability which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device as well as a web-browser application resident on the client device. The cloud-based remote access for a wearable electronic device, can be accessed by a mobile device, a desktop, a tablet device, and other similar devices, anytime, anywhere. Thus, the cloud-based remote access to a wearable electronic device hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable electronic device, and 5) combinations of these.

In an embodiment, the server computing system 1304A may include a server engine, a web page management component, a content management component, and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, when executed on the server computing system 1304A, causes the server computing system 1304A to display windows and user interface screens on a portion of a media space, such as a web page. A user via a browser or local app from the client computing system 1302A may interact with the web page, and then supply input to the query/fields and/or service presented by a user interface of the application. The web page may be served by a web server computing system 1304A on any, for example, Hypertext Markup Language (HTML) or Wireless Access Protocol (WAP) enabled client computing system 1302A or any equivalent thereof. For example, the client mobile computing system 1302A may be a wearable electronic device, smart phone, a touch pad, a laptop, a netbook, vehicle, augmented reality device, etc.

Computing Devices

Figure 14:
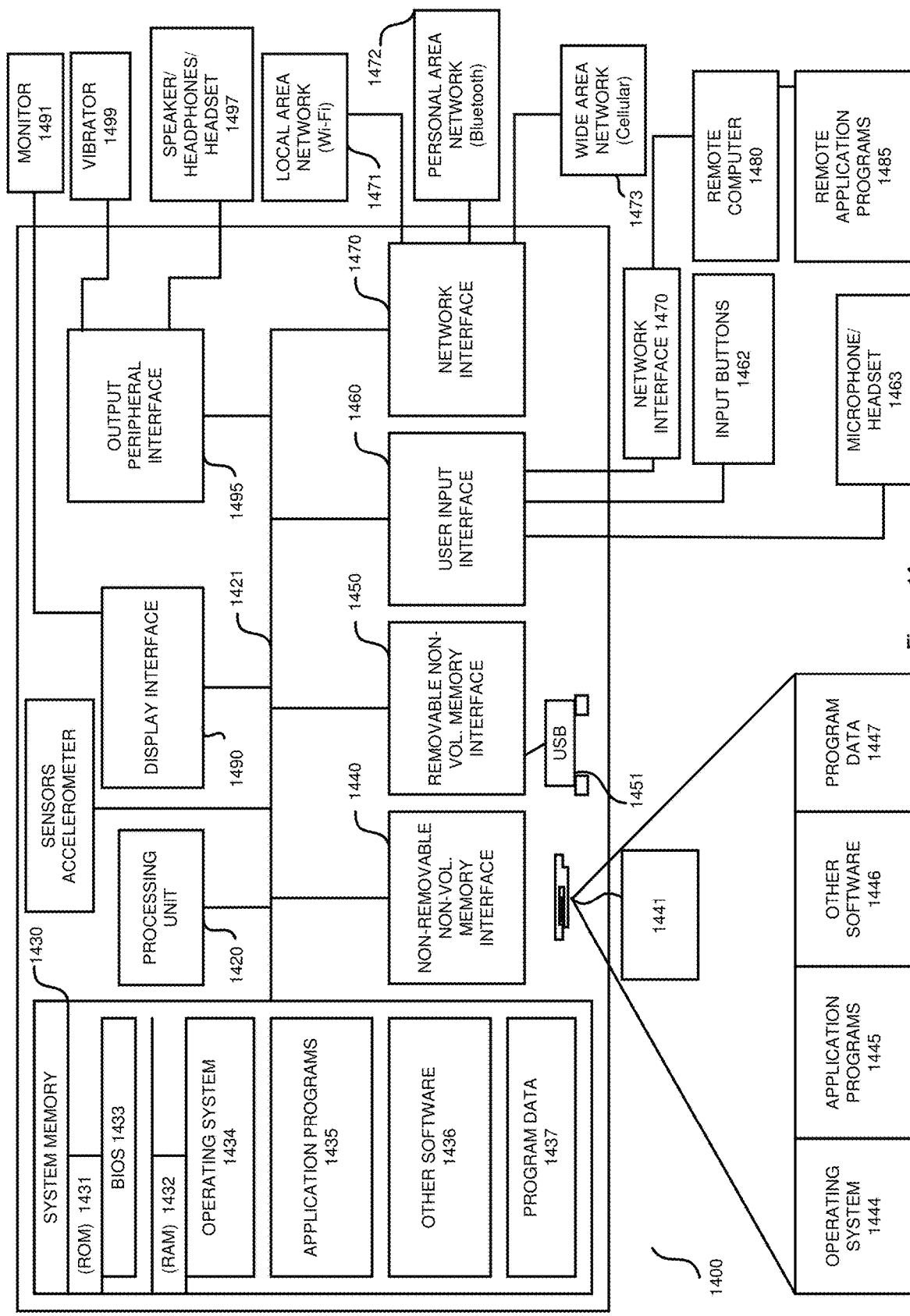
FIG. 14 illustrates a diagram of an embodiment of one or more computing devices that can be a part of the systems associated with the machine to assist in steganography for the animal and its associated models discussed herein.

FIG. 14 illustrates a diagram of an embodiment of one or more computing devices that can be a part of the systems associated with the machine to assist in steganography for an animal and its associated modules discussed herein.

The computing device may include one or more processors or processing units 1420 to execute instructions, one or more memories 1430-1432 to store information, one or more data input components 1460-1463 to receive data input from a user of the computing device 1400, one or more modules that include the management module, a network interface communication circuit 1470 to establish a communication link to communicate with other computing devices external to the computing device, one or more sensors where an output from the sensors is used for sensing a specific triggering condition and then correspondingly generating one or more preprogrammed actions, a display screen 1491 to display at least some of the information stored in the one or more memories 1430-1432 and other components. Note, portions of the machine and its modules to assist in steganography for an animal implemented in software 1444, 1445, 1446 are stored in the one or more memories 1430-1432 and are executed by the one or more processors 1420.

Components of the computing system 1400 may include, but are not limited to, a processing unit 1420 having one or more processing cores, a system memory 1430, and a system bus 1421 that couples various system components including the system memory 1430 to the processing unit 1420. The system bus 1421 may be any of several types of bus structures selected from a memory bus, an interconnect fabric, a peripheral bus, and a local bus using any of a variety of bus architectures.

Computing system 1400 typically includes a variety of computing machine-readable media. Machine-readable media can be any available media that can be accessed by computing system 1400 and includes both volatile and nonvolatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 1400. Transitory media such as wireless channels are not included in the machine-readable media. Machine-readable media typically embody computer readable instructions, data structures, other executable software.

The system memory 1430 includes computer storage media in the form of volatile and/or nonvolatile memory such as read only memory (ROM) 1431 and random access memory (RAM) 1432. A basic input/output system 1433 (BIOS) containing the basic routines that help to transfer information between elements within the computing system 1400, such as during start-up, is typically stored in ROM 1431. RAM 1432 typically contains data and/or software that are immediately accessible to and/or presently being operated on by the processing unit 1420. By way of example, and not limitation, the RAM 1432 can include a portion of the operating system 1434, application programs 1435, other executable software 1436, and program data 1437.

The computing system 1400 can also include other removable/non-removable volatile/nonvolatile computer storage media. An example a solid-state memory 1441 is shown. Other removable/non-removable, volatile/nonvolatile computer storage media that can be used in the example operating environment include, but are not limited to, USB drives and devices, flash memory cards, solid state RAM, solid state ROM, and the like. The solid-state memory 1441 is typically connected to the system bus 1421 through a non-removable memory interface such as interface 1440, and USB drive 1451 is typically connected to the system bus 1421 by a removable memory interface, such as interface 1450.

The drives and their associated computer storage media provide storage of computer readable instructions, data structures, other executable software, and other data for the computing system 1400. For example, the solid-state memory 1441 is illustrated for storing operating system 1444, application programs 1445, other executable software 1446, and program data 1447. Note that these components can either be the same as or different from operating system 1434, application programs 1435, other executable software 1436, and program data 1437. Operating system 1444, application programs 1445, other executable software 1446, and program data 1447 are given different numbers here to illustrate that, at a minimum, they are different copies.

A user may enter commands and information into the computing system 1400 through input devices such as a keyboard, touchscreen, or software or hardware input buttons 1462, a microphone 1463, a pointing device and/or scrolling input component, such as a mouse, trackball or touch pad. The microphone 1463 can cooperate with speech recognition software. These and other input devices are often connected to the processing unit 1420 through a user input interface 1460 that is coupled to the system bus 1421, but can be connected by other interface and bus structures, such as a lighting port, game port, or a universal serial bus (USB). A display monitor 1491 or other type of display screen device is also connected to the system bus 1421 via an interface, such as a display interface 1490. In addition to the monitor 1491, computing devices may also include other peripheral output devices such as speakers 1497, a vibrator 1499, and other output devices, which may be connected through an output peripheral interface 1495.

The computing system 1400 can operate in a networked environment using logical connections to one or more remote computers/client devices, such as a remote computing system 1480. The remote computing system 1480 can a personal computer, a mobile computing device, a server, a router, a network PC, a peer device or other common network node, and typically includes many or all of the elements described above relative to the computing system 1400. The logical connections can include a personal area network (PAN) 1472 (e.g., Bluetooth®), a local area network (LAN) 1471 (e.g., Wi-Fi), and a wide area network (WAN) 1473 (e.g., cellular network), but may also include other networks such as a personal area network (e.g., Bluetooth®). Such networking environments are commonplace in offices, enterprise-wide computer networks, intranets and the Internet. A browser application and/or one or more local apps may be resident on the computing device and stored in the memory.

When used in a LAN networking environment, the computing system 1400 is connected to the LAN 1471 through a network interface 1470, which can be, for example, a Bluetooth® or Wi-Fi adapter. When used in a WAN networking environment (e.g., Internet), the computing system 1400 typically includes some means for establishing communications over the WAN 1473. With respect to mobile telecommunication technologies, for example, a radio interface, which can be internal or external, can be connected to the system bus 1421 via the network interface 1470, or other appropriate mechanism. In a networked environment, other software depicted relative to the computing system 1400, or portions thereof, may be stored in the remote memory storage device. By way of example, and not limitation, remote application programs 1485 as reside on remote computing device 1480. It will be appreciated that the network connections shown are examples and other means of establishing a communications link between the computing devices that may be used.

As discussed, the computing system 1400 can include a processing unit 1420, a memory (e.g., ROM 1431, RAM 1432, etc.), a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to this Figure. However, the present design can be carried out on a server, a computing device devoted to message handling, or on a distributed system in which different portions of the present design are carried out on different parts of the distributed computing system.

Another device that may be coupled to bus 1421 is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

The design can be also described in the general context of computing device executable instructions, such as applications etc. being executed by a computing device. Generally, programs include routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. A machine to assist in steganography for an animal, comprising:
 a steganography module configured to use behavioral sequencing to create a cover message and a hidden message to covertly pass information from one animal to another animal, with the information embedded in an individual's brain,
 a visual module configured to cooperate with the steganography module, where the visual module is configured to cause a sequence of visual images on a display screen to guide a motor sequence of an individual as the cover message and communicate with a feedback module to detect and communicate a timing of the individual's motor sequence, relative in timing, to visual images in the sequence of visual images being displayed on the display screen, in order to train in the cover message and hidden message, and where an offset in the individual's motor sequence, guided by a training module configured to cooperate with the steganography module, conveys the hidden message of the steganography, which is not accomplished by passing digital information in a memory circuit or via a wireless signal, but rather the hidden message is stored inside the individual's brain and then extracted at a destination from a sensor monitoring the individual's sequence of motor actions, where the training module and the visual module cooperate to provide any of i) visual images, ii) audio cues, iii) haptic feedback and iv) any combination of these, to guide the sequence of motor actions and its timing for the individual to learn the cover message and the hidden message.

2. The machine to assist in steganography for the animal of claim 1, further comprising:

where the training module is further configured to cooperate with the steganography module and a timing module, to cause the sequence of the visual images on the display screen to guide the motor sequence of the individual to learn the cover message and the hidden message, where the training module and the visual module cooperate to utilize a device selected from a group consisting of i) a joystick, ii) a moving image projected on a display screen, iii) an application on a smart mobile device, iv) an application on a desktop computing device, v) a guitar, and vi) any combination of these, to visually train the motor sequence of the individual.

3. The machine to assist in steganography for the animal of claim 1, where an audio module communicating with the training module is configured to make the audio cues to cue and communicate to the individual the offset in the timing of the individual's motor sequence, relative in timing, to the visual images in the sequence of visual images being displayed on the display screen in accordance with instructions from the training module.

4. The machine to assist in steganography for the animal of claim 1, further comprising:

a timing module, an audio module, and where the steganography module is configured to cooperate with the timing module, the visual module, and the audio module to cause a biasing of a timing of the motor sequence of the individual with the audio module making the audio cues, where the audio module is configured to make the audio cues relative to an appearance of visual images from the visual module being displayed on the display screen, and then using the motor sequence as the cover message, with the relative timing errors in the actions of the motor sequence relative to displayed images as the hidden message.

5. The machine to assist in steganography for the animal of claim 1, where an audio module, the visual module, the feedback module, and a timing module are configured to cooperate to train such that the hidden message is stored inside the individual's brain; and then, to be interpreted from the individual's sequence of motor actions as captured by the sensor at the destination.

6. The machine to assist in steganography for the animal of claim 1, where the visual module, the feedback module, an interface device that can detect motor interactions as the sensor, and a timing module are configured to cooperate to decode and decipher the hidden message in the sequence of images and the relative timing errors in the individual's sequence of motor actions as captured by the sensor in response to the sequences of images.

7. The machine to assist in steganography for the animal of claim 1, where the machine is configured to use a moving image on a display screen to visually display the sequence of visual images to the individual's brain and then an audio module is configured to make sounds to induce the relative timing differences for the sequence of images, and then also use haptic feedback to reinforce an offset in the timing to assist in getting the correct offset in their motor sequence in relation to the displayed visual images.

8. The machine to assist in steganography for the animal of claim 1, where a feedback module is configured to use any combination of i) a camera, ii) the individual's interaction with a touch screen, iii) a keyboard, iv) a device with an accelerometer, and v) any combination of both, as the sensor, to capture an actual sequence the individual's relative timing errors across their motor sequence relative to the displayed images in order to detect and decipher relevant bits of the hidden message.

9. The machine to assist in steganography for the animal of claim 1, further comprising:

where the feedback module is configured to use both a camera and a touch screen, as the sensor, monitoring the individual's sequence of motor actions, in order to monitor the individual's interaction with a touch screen to capture their actual sequence and then communicate this feedback to the steganography module to compare a recorded offset to a desired offset and i) a matrix or ii) a vector to decipher what is the hidden message within the cover message.

10. A method to assist in steganography for an animal, comprising;

configuring a steganography module to apply behavioral sequencing to create a cover message and a hidden message to covertly pass information from one animal to another animal, with the information embedded in an individual's brain, configuring a visual module to reference the steganography module to cause a sequence of visual images on a display screen to guide a motor sequence of an individual as the cover message and communicate with a feedback module to detect and communicate a timing of the individual's motor sequence, relative in timing, to visual images in the sequence of visual images being displayed on the display screen, in order to train in the cover message and hidden message, and where an offset in the individual's motor sequence conveys the hidden message of the steganography, which is not accomplished by passing digital information in a memory circuit or via a wireless signal, but rather the hidden message is stored inside the individual's brain and then extracted at a destination from a sensor monitoring the individual's sequence of motor actions, where the training module and the visual module cooperate to provide any of i) visual images, ii) audio cues, iii) haptic feedback and iv) any combination of these, to guide the sequence of motor actions and its timing for the individual to learn the cover message and the hidden message.

11. The method to assist in steganography for the animal of claim 10, further comprising:

configuring a training module to cause the sequence of visual images on the display screen to guide the motor sequence of the individual to learn the cover message and the hidden message, where the training module and the visual module cooperate to utilize a device selected from a group consisting of i) a joystick, ii) a moving image projected on a display screen, iii) an application on a smart mobile device, iv) an application on a desktop computing device, v) a guitar, and vi) any combination of these, to visually train the motor sequence of the individual.

12. The method to assist in steganography for the animal of claim 10, further comprising:
configuring the steganography module to cooperate with a timing module, the visual module, and an audio module to cause a biasing of a timing of the motor sequence of the individual with the audio module making audio sounds, where the audio module is configured to make the audio sounds relative to an appearance of visual images from the visual module being displayed on the display screen, and then using the motor sequence as the cover message, with the relative timing errors to displayed images as the hidden message.

13. The method to assist in steganography for the animal of claim 10, further comprising:
configuring an audio module, the visual module, the feedback module, and a timing module to cooperate to train in the hidden message as stored inside the individual's brain; and then, to be interpreted from the individual's sequence of motor actions as captured by the sensor at the destination.

14. The method to assist in steganography for the animal of claim 10, further comprising:
configuring the visual module, the feedback module, an interface device that can detect motor interactions as the sensor, and a timing module to cooperate to decode and decipher the hidden message in the sequence of images and the relative timing errors in the individual's sequence of motor actions as captured by the sensor in response to the sequence of images.

15. The method to assist in steganography for the animal of claim 10, further comprising:
using a mobile app and a display screen of a smart mobile device to visually display the sequence of visual images to the individual's brain;
using an audio module to make sounds to induce the relative timing differences for the sequence of images; and then
using also haptic feedback in the smart mobile device to reinforce an offset in the timing when the individual is not getting the correct offset in their motor sequence in relation to the displayed visual images.

16. The method to assist in steganography for the animal of claim 10, further comprising:
configuring an audio module to make a sound to cue and communicate to the individual an offset in the timing of the individual's motor sequence, relative in timing, to visual images in the sequence of visual images being displayed on the display screen in accordance with instructions from the training module, and where the feedback module uses hand movements captured by a touch screen and/or a camera of a smart mobile device to record the offset in the timing of the individual's motor sequence, relative in timing, to visual images in the sequence of visual images being displayed on the display screen.

17. The method to assist in steganography for the animal of claim 10, further comprising:
configuring the feedback module to use any combination of i) a camera, ii) the individual's interaction with a touch screen, iii) a keyboard, iv) a device with an accelerometer, and v) any combination of both, as the sensor, to capture an actual sequence the individual's relative timing errors across their motor sequence relative to the displayed images in order to detect and decipher relevant bits of the hidden message.

18. The method to assist in steganography for the animal of claim 10, further comprising:
configuring the feedback module to use any combination of i) a camera, ii) the individual's interaction with a touch screen, iii) a keyboard, iv) a device with an accelerometer, and v) any combination of both, as the sensor, to capture an actual sequence the individual's relative timing errors across their motor sequence relative to the displayed images in order to detect and decipher relevant bits of the hidden message.

19. The method to assist in steganography for the animal of claim 10, further comprising:
configuring the steganography module and the training module to cooperate to cause the sequence of visual images on the display screen to guide the motor sequence of the individual so that the individual learns the cover message and the offset in the individual's motor sequence so that the individual learns the hidden message, without the individual actually being aware that they are learning the motor sequence that corresponds to the cover message and the offset in the individual's motor sequence that corresponds to the hidden message of the steganography, and
where the lack of awareness of the individual that they are learning the motor sequence that corresponds to the cover message and the offset in the individual's motor sequence that corresponds to the hidden message does not affect any of i) a time to learn the motor sequence and the offset in the individual's motor sequence, ii) gaining an ability to perform the motor sequence and the offset in the individual's motor sequence, and iii) any combination of these two.

20. A computer-readable medium storing instructions that, when executed by one or more processors in a computing device, cause the computing device to perform operations, comprising:
using a steganography module to apply behavioral sequencing to create a cover message and a hidden message to covertly pass information from one animal to another animal, with the information embedded in an individual's brain,
using a visual display to reference the steganography module to cause a sequence of visual images on a display screen to guide a motor sequence of an individual as the cover message and communicate with a feedback module to detect and communicate a timing of the individual's motor sequence, relative in timing, to visual images in the sequence of visual images being displayed on the display screen, in order to train in the cover message and hidden message, and
where an offset in the individual's motor sequence conveys the hidden message of the steganography, which is not accomplished by passing digital information in a memory circuit or via a wireless signal, but rather the hidden message is stored inside the individual's brain and then extracted at a destination from a sensor monitoring the individual's sequence of motor actions, where the training module and the visual module cooperate to provide any of i) visual images, ii) audio cues, iii) haptic feedback and iv) any combination of these, to guide the sequence of motor actions and its timing for the individual to learn the cover message and the hidden message.

\* \* \* \* \*